(12) United States Patent
Misra et al.

(10) Patent No.: US 10,447,834 B2
(45) Date of Patent: Oct. 15, 2019

(54) ELECTRONIC DEVICE HAVING A COMPOSITE STRUCTURE

(71) Applicant: Apple Inc., Cupertino, CA (US)

(72) Inventors: Abhijeet Misra, Sunnyvale, CA (US); Steven J. Osborne, Sunnyvale, CA (US); Ian A. Spraggs, San Francisco, CA (US); Marwan Rammah, San Francisco, CA (US); William A. Counts, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/606,920

(22) Filed: May 26, 2017

(65) Prior Publication Data

US 2018/0084653 A1 Mar. 22, 2018

Related U.S. Application Data

(60) Provisional application No. 62/397,781, filed on Sep. 21, 2016.

(51) Int. Cl.
*H05K 5/00* (2006.01)
*H04M 1/18* (2006.01)
(Continued)

(52) U.S. Cl.
CPC ............ *H04M 1/185* (2013.01); *G06F 1/163* (2013.01); *G06F 1/1626* (2013.01);
(Continued)

(58) Field of Classification Search
CPC ........................................................ G06F 1/16
(Continued)

(56) References Cited

U.S. PATENT DOCUMENTS

| 6,058,293 A | 5/2000 | Phillips |
| 7,449,100 B2 | 11/2008 | Yoshimura et al. |

(Continued)

FOREIGN PATENT DOCUMENTS

| CN | 1500157 | 5/2004 |
| CN | 101235500 | 8/2008 |

(Continued)

OTHER PUBLICATIONS

Welding of Coated Steels, Total Materia Article, http://www.totalmateria.com/page.aspx?ID_CheckArticle&site=kts&NM=191, published Dec. 2006, 3 pages.

(Continued)

*Primary Examiner* — Jerry Wu
(74) *Attorney, Agent, or Firm* — Brownstein Hyatt Farber Schreck, LLP

(57) ABSTRACT

Embodiments are directed to an enclosure for an electronic device. In one aspect, an embodiment includes an enclosure having an enclosure component and an internal component that may be affixed along a bonding region. The enclosure component may be formed from an enclosure material and defines an exterior surface of the enclosure and an opening configured to receive a display. The internal component may be formed from a metal material different than the enclosure material. The bonding region may include an interstitial material that has a melting temperature that is less than a melting temperature of either one of the enclosure material or the metal material. The bonding region may also include one or more of the enclosure material or the metal material.

18 Claims, 17 Drawing Sheets

(51) Int. Cl.
*G06F 1/16* (2006.01)
*H04M 1/02* (2006.01)

(52) U.S. Cl.
CPC ........ *G06F 1/1656* (2013.01); *H04M 1/0249* (2013.01); *H04M 1/026* (2013.01); *H04M 1/0283* (2013.01)

(58) Field of Classification Search
USPC .................................................. 361/679.01
See application file for complete search history.

(56) References Cited

U.S. PATENT DOCUMENTS

| | | | |
|---|---|---|---|
| 7,473,864 B2 | 1/2009 | Iwase et al. | |
| 7,800,011 B2 | 9/2010 | Fukuda et al. | |
| 8,191,231 B2 | 6/2012 | Lo et al. | |
| 8,502,105 B2 | 8/2013 | Tanaka et al. | |
| 8,507,825 B2 | 8/2013 | Miyamoto et al. | |
| 9,241,435 B2 | 1/2016 | Ho et al. | |
| 9,668,859 B2 | 1/2017 | Au et al. | |
| 9,607,914 B2 | 3/2017 | Gwin | |
| 9,699,926 B2 | 7/2017 | Hwang et al. | |
| 9,819,076 B2 | 11/2017 | Koo | |
| 2004/0099716 A1* | 5/2004 | Yuan | H01L 24/10 228/246 |
| 2004/0227679 A1 | 11/2004 | Lu | |
| 2007/0216580 A1 | 9/2007 | Lin et al. | |
| 2008/0259537 A1* | 10/2008 | Arisaka | G06F 1/203 361/679.08 |
| 2009/0189827 A1 | 7/2009 | Yang et al. | |
| 2010/0108745 A1* | 5/2010 | Heinz | B23K 1/0018 228/119 |
| 2010/0156750 A1 | 6/2010 | Ishibashi et al. | |
| 2010/0243300 A1* | 9/2010 | Amin | H05K 3/244 174/257 |
| 2011/0186347 A1 | 8/2011 | Zhang et al. | |
| 2011/0250400 A1 | 10/2011 | Lee et al. | |
| 2014/0243911 A1* | 8/2014 | Almarza | A61B 17/8605 606/305 |
| 2014/0246323 A1* | 9/2014 | Porter | C25D 11/16 205/50 |
| 2015/0352658 A1 | 12/2015 | Yang et al. | |
| 2016/0227655 A1 | 8/2016 | Han et al. | |
| 2018/0103557 A1 | 4/2018 | Wright et al. | |

FOREIGN PATENT DOCUMENTS

| | | |
|---|---|---|
| CN | 101536063 | 9/2009 |
| CN | 101994105 | 3/2011 |
| CN | 103095866 | 5/2013 |
| CN | 204733194 | 10/2015 |

OTHER PUBLICATIONS

Welding of Dissimilar Metals, Total Materia Article, http://www.totalmateria.com/page.aspx?ID-CheckArticle&site=ktn&NM=152, 4 pages.

* cited by examiner

DETAIL 2-2

ELECTRONIC DEVICE HAVING A COMPOSITE STRUCTURE

CROSS-REFERENCE TO RELATED APPLICATION

This application claims the benefit under 35 U.S.C. § 119(e) of U.S. Provisional Patent Application No. 62/397,781, filed on Sep. 21, 2016, and entitled "Aluminum-Steel Composite," the contents of which are incorporated by reference as if fully disclosed.

FIELD

The described embodiments relate generally to an electronic device having two dissimilar materials joined along a bonding region. More particularly, the present embodiments relate to joining dissimilar metals and/or a metal component and a ceramic component via an interstitial material to form an electronic device enclosure.

BACKGROUND

Dissimilar materials may be joined together to form an electronic device enclosure or other composite structure. The composite structure may exhibit material properties of one or both of the materials. For dissimilar metals, such composites may be susceptible to brittle fracture or other failure modes at a joint or bonding region between the dissimilar materials. For example, directly joining (e.g., welding) dissimilar metals having different melting temperatures, electrical or thermal conductivities, and/or tensile strengths may contribute to the production of brittle intermetallic compounds.

SUMMARY

Embodiments of the present invention are directed to an electronic device enclosure and methods for forming the same.

In a first aspect, the present disclosure includes an enclosure for an electronic device. The enclosure includes an enclosure component formed from an enclosure material. The enclosure component may define an exterior surface of the enclosure and an opening configured to receive a display. The enclosure further includes an internal component formed from a metal material that may be different than the enclosure material and affixed to the enclosure component along a bonding region. The bonding region may include an interstitial material that has a melting temperature less than a melting temperature of either one of the enclosure material or the metal material. The bonding region may also include one or more of the enclosure material or the metal material.

A number of feature refinements and additional features are applicable in the first aspect and contemplated in light of the present disclosure. These feature refinements and additional features may be used individually or in any combination. As such, each of the following features that will be discussed may be, but are not required to be, used with any other feature combination of the first aspect.

For example, in an embodiment, the bonding region includes a blended melt layer formed from the interstitial material and the one or more of the enclosure material or the metal material. The blended melt layer may be affixed to both of the enclosure component and the internal component. In some cases, the enclosure material may be aluminum and the metal material may be steel. In other cases, the enclosure material may be a ceramic and the metal material may be steel.

In another embodiment, the interstitial material may include at least one of nickel, zinc, or aluminum alloy. The enclosure may be configured to receive a printed circuit board (PCB). In this regard, the internal component may be configured to electrically conduct a signal received from the PCB. Additionally or alternatively, the internal component may form an electrical shield along an interior surface of the enclosure.

In this regard, a second aspect of the present disclosure includes a method of manufacturing a device enclosure. The method includes abutting an enclosure component and an internal component along a bonding region. The method further includes affixing the enclosure component to the internal component by heating the bonding region to a temperature that is less than a melting temperature of one of the enclosure component or the internal component. The internal component may include a interstitial material at the bonding region. The interstitial material and the enclosure component may form a blended melt layer within the bonding region in response to the heating.

A number of feature refinements and additional features are applicable in the second aspect and contemplated in light of the present disclosure. These feature refinements and additional features may be used individually or in any combination. As such, each of the following features that will be discussed may be, but are not required to be, used with any other feature combination of the second aspect.

For example, in an embodiment, the internal component may define a threaded feature. In this regard, the method may further include attaching a printed circuit board (PCB) to the enclosure component by advancing a fastener through the PCB and into the threaded feature. Additionally or alternatively, the method may further include anodizing at least one of the enclosure component or the internal component prior to affixing the enclosure component and the internal component.

According to another embodiment, the interstitial material may include one of nickel, zinc, or aluminum alloy. The interstitial material may coat the internal component prior to affixing the enclosure component and the internal component. In some cases, the interstitial material may be a first interstitial material and the enclosure component may include a second interstitial material at the bonding region. The first and second interstitial materials and the enclosure component may form the blended melt layer within the bonding region in response to the heating.

In another embodiment, affixing the enclosure component and the internal component may further include compressing the enclosure component and the internal component.

Additionally or alternatively, heating the bonding region may further include applying an ultrasonic vibration to at least one of the enclosure component and the internal component.

In this regard, a third aspect of the present disclosure includes an enclosure for an electronic device. The enclosure includes an enclosure component formed from an enclosure material and having sidewalls that define an internal volume and a top surface that defines an opening configured to receive a touch-sensitive display. The enclosure further includes a structural member formed from a steel-based material. The enclosure further includes a first interstitial material affixed to a surface of the enclosure component. The enclosure further includes a second interstitial material affixed to a surface of the structural member. A portion of the first and second interstitial materials form a blended melt layer joining the enclosure component and the structural member within the internal volume of the enclosure. A melting temperature of each of the first and second interstitial materials is less than a melting temperature of the steel-based material.

A number of feature refinements and additional features are applicable in the third aspect and contemplated in light of the present disclosure. These feature refinements and additional features may be used individually or in any combination. As such, each of the following features that will be discussed may be, but are not required to be, used with any other feature combination of the third aspect.

For example, in an embodiment, the blended melt layer may be formed from at least a portion of the enclosure component. In some cases, the structural member may define a threaded feature. The structural member may be configured to secure a printed circuit board (PCB) to the enclosure component by receiving a threaded fastener that extends through the PCB. The PCB may include a processing unit configured to control a function of the electronic device.

According to another embodiment, the structural member may be a rib extending between the sidewalls of the enclosure. The rib may be configured to provide rigidity to an exterior surface of the enclosure. The rib may separate the internal volume into discrete compartments. One of the discrete compartments may be configured to receive a printed circuit board (PCB). The rib may define a passage configured to receive a set of wires extending from the PCB and between the discrete compartments of the internal volume.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
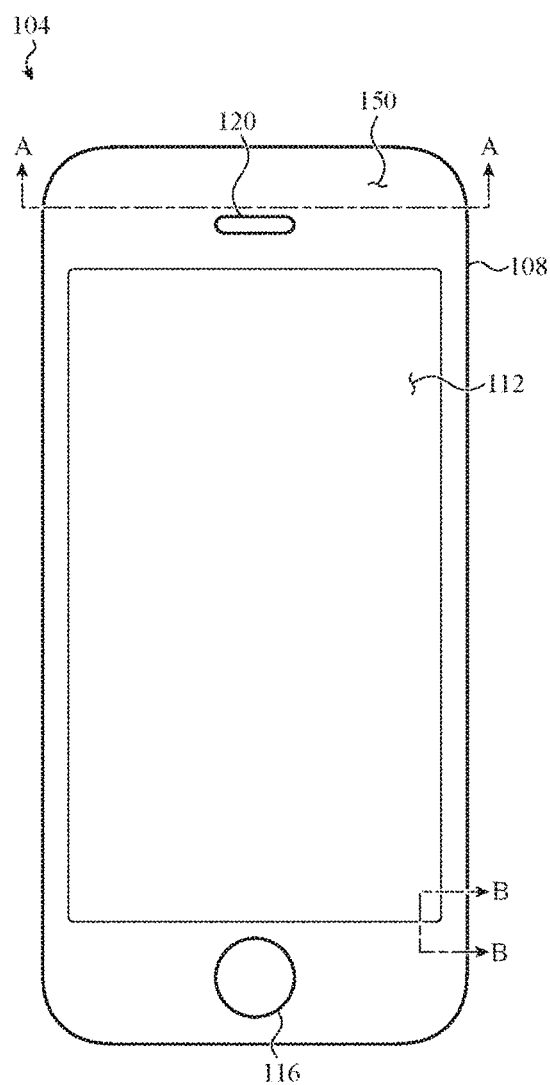
FIG. 1 depicts a sample electronic device including a composite structure.

The description that follows includes sample systems, methods, and apparatuses that embody various elements of the present disclosure. However, it should be understood that the described disclosure may be practiced in a variety of forms in addition to those described herein.

The present disclosure describes systems, devices, and techniques related to forming a device enclosure from dissimilar materials. The dissimilar materials may be affixed to one another to form a composite structure that may define multiple different features or elements of the device enclosure. For example, a first dissimilar material may form an enclosure component (e.g., including sidewalls, top and bottom panels, external cases, cover, or the like) and a second dissimilar material may form an internal component (e.g., including bosses, ribs, plates, shields, fasteners, or the like). Affixing the enclosure component and the internal component to form a composite structure may allow the device enclosure to exhibit material properties of one or both of the constituent dissimilar materials.

The enclosure component and the internal component may be non-separable within the composite structure. For example, the enclosure component and the internal component may be permanently affixed or coupled to one another such that the enclosure component and the internal component do not delaminate or separate without the composite structure breaking. In particular, the enclosure component and the internal component may be affixed to one another at or through a bonding region of the composite structure. The bonding region may include, or be defined by, a blended melt layer that is affixed to each of the enclosure component and the internal component. The blended melt region may be formed from an interstitial material and one or more of the dissimilar materials that form the enclosure component and the internal component.

A coupling process may affix the enclosure component to the internal component at the bonding region using the interstitial material. For example, the interstitial material may be adhered or affixed to one or both of the enclosure component and the internal component (e.g., platting, cladding, coatings, or the like, described herein) and have a melting temperature that is less than a melting temperature of either one of the enclosure component or the internal component. In this regard, in one embodiment, the coupling process may involve abutting the enclosure component and the internal component along a bonding region that includes the interstitial material, and subsequently heating the bonding region to a bonding temperature. The bonding temperature may be calibrated to melt the interstitial material and the one or more of the dissimilar materials that form the enclosure component and the internal component. This may cause the blended melt layer to form. In this regard, the blended melt layer may be defined by a heterogeneous layer having material elements of the interstitial material chemically or atomically bonded to material elements of the dissimilar materials. In other embodiments, as described herein, the coupling process may produce a blended melt layer substantially defined by the interstitial material (e.g., as may be the case when the coupling process causes the interstitial material to melt but not the aluminum component).

In an embodiment, the coupling process may affix the enclosure component and the internal component without melting the internal component at the bonding region. For example, the bonding temperature may be less than a melting temperature of the dissimilar material that forms the internal component. The interstitial material may be plated, cladded, or otherwise affixed to a surface of the internal component prior to forming the blended melt region. Accordingly, the internal component may be affixed to the blended melt region via the interstitial material. The interstitial material may thereby define a transition region at which a portion of the interstitial material is attached to the internal component (via plating, cladding, or the like) and another portion of the interstitial material is attached to the enclosure component (via the blended melt region). Where the dissimilar materials are, for example, aluminum and steel, this may result in composite structure with substantially reduced brittle intermetallic compounds that would impede or otherwise weaken the cohesiveness of an aluminum and steel bond.

It will be appreciated that the composite structure may include any appropriate interstitial material having material properties that allow it to affix to one, or both, of the dissimilar materials that form the blended melt region. As described herein, sample interstitial materials may include nickel, zinc, or aluminum components or alloy. In other embodiments, other interstitial materials are contemplated within the spirt of this disclosure.

The interstitial materials may be arranged in any appropriate shape, configuration, or position at the bonding region to facilitate the coupling process described herein. In one embodiment, the interstitial material may be deposited onto a surface of the enclosure component and the aluminum component prior to the coupling process. The coupling process may cause a portion of the interstitial material that is deposited on the enclosure component to melt with, and into, a portion of the interstitial material that is deposited on the internal component, thereby defining the blended melt layer of the composite structure. The respective interstitial materials may thus form direct or chemical bonds between one another, and optionally with one of the dissimilar materials, to form the blended melt layer that affixes the enclosure component and the internal component along the bonding region.

In another embodiment, the interstitial material may be deposited on the internal component prior to the coupling process and the enclosure component may be substantially free of interstitial material prior to the coupling process. The coupling process may cause a portion of the interstitial material to melt with a portion of the enclosure component to define the blended melt region of the composite structure through direct bonds between the enclosure component and the interstitial material.

A variety of techniques may be implemented to form the composite structure. In one non-limiting example, the enclosure component may be abutted to the internal component along a bonding region such that the interstitial material is positioned between the enclosure component and the internal component. The bonding region (or a portion thereof) may be heated to affix the enclosure component and the internal component in a manner that substantially reduces brittle intermetallic compounds, according to the embodiments described herein. For instance, heat may be applied to the bonding region to melt a portion of the interstitial material (and optionally a portion of one of the enclosure or internal components) without melting the other one of the enclosure or internal components. The bonding region may be heated by any appropriate technique, including direct heat (e.g., via a welding torch or similar implement), electrical heating elements, and/or other techniques operative to heat the bonding region, including techniques operative to heat a localized region of the bonding region. In some instances, a compression or ultrasonic vibration may be applied to the bonding interface to affix the enclosure and internal components.

The enclosure component and the internal components may be formed from a variety of dissimilar materials. In one embodiment, the enclosure component and the internal component may be formed from dissimilar metals, such as aluminum and steel. For example, the enclosure component may be an aluminum sheet that forms an exterior surface of a device enclosure and the internal component may be a steel component that defines a threaded feature (e.g., such as a threaded feature that receives a threaded fastener for securing a printed circuit board (PCB) to the enclosure component). The blended melt region may affix the aluminum component and the steel component. For example, as described herein, the blended melt region may include an interstitial material and a portion of the aluminum component, such that the blended melt region is formed by direct bonds between the interstitial material and the aluminum component. This may substantially reduce brittle intermetallic compounds that may otherwise be present when directly bonding aluminum to steel. Further, the blended melt region may allow the steel component to be affixed to an anodized or otherwise coated or treated aluminum structure. In other embodiments, other dissimilar metals are contemplated.

In other embodiments, one of the dissimilar materials may be a ceramic. For example, the enclosure component may be a ceramic sheet that forms an exterior surface of a device enclosure and the internal component may be a steel component that defines a threaded feature, as described above. The blended melt region may affix the ceramic component and the steel component. For example, as described herein, the blended melt region may include an interstitial material and a portion of the aluminum component, such that the blended melt region is formed by direct bonds between the interstitial material and one or both of the ceramic component or the steel component. In a particular implementation, the interstitial material may extend between the ceramic and metal components and may be a foil or a sheet constructed from tin, aluminum, or other material having a lower melting point than that of the metal component (e.g., such as a lower melting temperature than a titanium component). A bonding tool, such as an ultrasonic transducer or other appropriate tool, may press the metal component toward the interstitial material and ceramic component and cause the metal component to rotate. The linear and/or rotational movement between the components may cause the interstitial material to melt, but not the metal or ceramic components. This may result in a molecular bond between the mating materials.

Reference will now be made to the accompanying drawings, which assist in illustrating various features of the present disclosure. The following description is presented for purposes of illustration and description. Furthermore, the description is not intended to limit the inventive aspects to the forms disclosed herein. Consequently, variations and modifications commensurate with the following teachings, and skill and knowledge of the relevant art, are within the scope of the present inventive aspects.

FIG. 1 depicts an example electronic device 104 having an composite structure, such as the composite structure generally discussed above and described in more detail below. For purposes of illustration, the electronic device 104 is depicted as having an enclosure 108, a display 112 (e.g., including a touch-sensitive display configured to receive input), one or more input/output members 116, and a speaker 120. It should be noted that the electronic device 104 may also include various other components, such as one or more ports (e.g., charging ports, data transfer ports, or the like), additional input/output buttons, and so on. As such, the discussion of any electronic device, such as electronic device 104, is meant as illustrative only.

The electronic device 104 may be substantially any type of device having an enclosure formed from dissimilar materials. Some example electronic devices may include desktop computers, notebook computers, smart phones (as shown in FIG. 1A), tablets, portable media players, or the like. Other example electronic devices may include wearable devices (including watches, gloves, rings, or the like), health monitoring devices (including pedometers, heart rate monitors, or the like), and other electronic devices, including digital cameras, printers, scanners, security systems or devices. In some cases, the electronic device 104 need not be an electronic device. For example, the electronic device 104 may be substantially any device with an outer shell, housing, enclosure, or the like constructed from dissimilar materials that form a composite structure having an interstitial material.

In one embodiment, the enclosure 108 may be formed from a composite structure having an enclosure component and an internal component affixed to one another using an interstitial materials that form a blended melt layer. This may allow the enclosure 108 to have dissimilar materials affixed to one another and forming different features or elements of the enclosure 108. For example, the enclosure 108 may include an enclosure component formed from an enclosure material and an internal component formed from a metal material different than the enclosure material affixed to one another along a bonding region defined by the blended melt layer (not shown in FIG. 1). As described in greater detail below, the enclosure component may define an exterior surface 150 of the enclosure 108 and enclose or define an internal volume of the electronic device 104. The internal component may be affixed to the enclosure component within the internal volume and may be a structural component of the electronic device.

In one embodiment, the enclosure 108 may be constructed of various combinations of aluminum and steel components. In one embodiment, the enclosure 108 may include an enclosure component formed from an aluminum or aluminum alloy and the internal component may be a steel component of steel alloy. The aluminum alloy may provide a durable, chemical resistant barrier between internal components of the electronic device (e.g., the PCB, sensors, switches or the like) and an external environment. For example, the enclosure 108 may be exposed to an external environment containing various contaminants, including oils, sweat, dust, moisture, and/or other contaminants that may adversely affect the operation of the electronic device 104. The aluminum component may physically obstruct such contaminants from entering the enclosure 108. Further, the aluminum component may exhibit a chemical resistivity such that it does not substantially break down, degrade, corrode, or otherwise diminish when exposed to the contaminants. The steel or steel alloy that forms the internal component may be bonded to the aluminum component within the internal volume of the electronic device and provide enhanced rigidity and hardness to the exterior surface 150 that is defined by the aluminum component. Additionally, the steel or steel alloy may be machineable, for example, to define a threaded feature or other structural member that is used to connect a component of the electronic device (e.g., such as the PCB) to the enclosure 108. In some cases, the internal component may be configured to electrically conduct a signal received from the PCB.

It will be appreciated that the foregoing example constructions of the enclosure 108 are presented for purposes of illustration. Other embodiments of the enclosure 108 formed from a composite structure of aluminum and steel are contemplated within the scope of this disclosure. For example, in some cases, the enclosure component may be formed from steel and the internal component may be formed from aluminum. Additionally or alternatively, the enclosure 108 may include a steel component having aluminum components affixed to opposing surfaces of the steel component using an interstitial material formed along each of the opposing surfaces of the steel component. In other cases, the enclosure 108 may include an aluminum component having steel components affixed to opposing surfaces of the aluminum component using an interstitial material formed along each of the opposing surface of the aluminum component. In other embodiments, other constructions of the enclosure 108 are completed, including embodiments having multiple, alternating layers of aluminum components affixed to steel components, according to the embodiments described herein.

In another implementation, the enclosure 108 may include a composite structure formed from a ceramic and a metal material. For example, the enclosure 108 may include an enclosure component formed from a ceramic material and an internal component formed from a metal material. The ceramic material and the metal material may be affixed to one another along a bonding region defined by an interstitial material (not shown in FIG. 1). As one possibility, as described with respect to FIG. 7, the internal components may be metal embossments or other protrusions affixed to the ceramic enclosure component outer surface using a bonding tool that rotates the metal component such that the interstitial material melts and subsequently bonds the metal and ceramic components to one another. In some cases, the metal component may be a decorative or aesthetic enhancement to the ceramic component. In other cases, the metal component may be a structural component of the electronic device 104 (e.g., such as an attachment feature configured to structurally support electronic circuitry of the electronic device 104).

Figure 2:
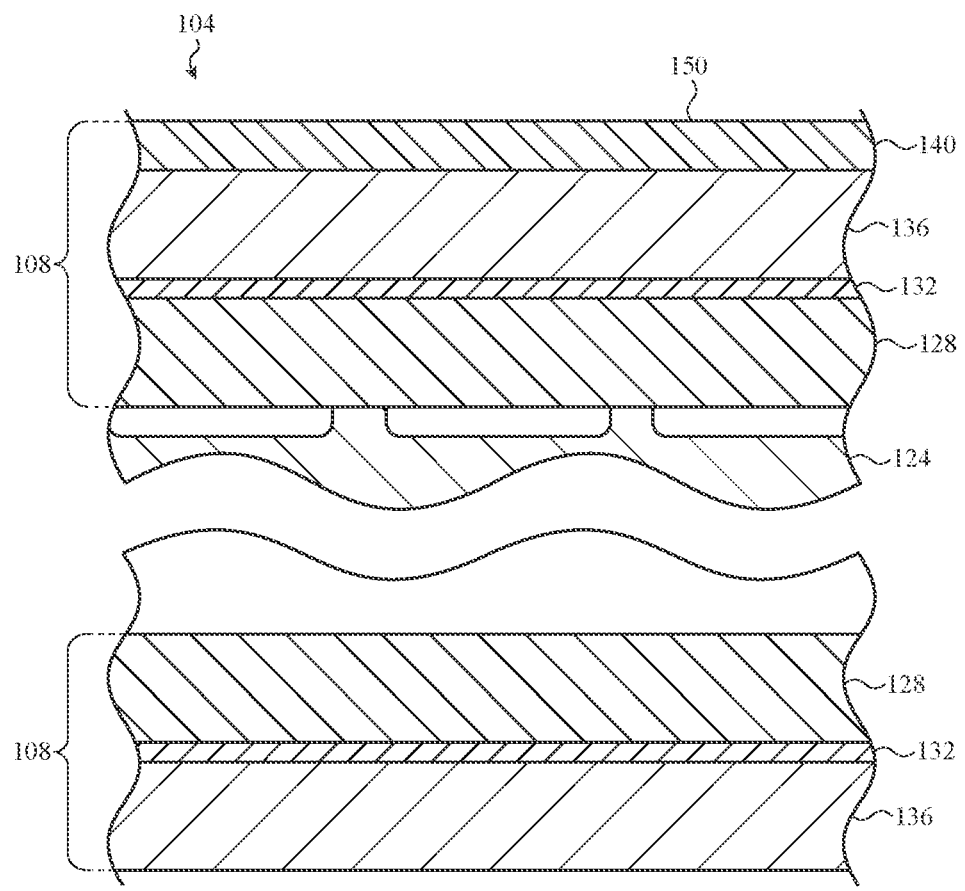
FIG. 2 depicts a cross-sectional view of the embodiment of the electronic device of FIG. 1, taken along line A-A of FIG. 1.

FIG. 2 is a cross-sectional view of the electronic device 104 of FIG. 1, taken along line A-A of FIG. 1. As illustrated, the electronic device 104 includes the enclosure 108 and device components 124. The device components 124 may be a PCB, sensor, or any other internal component of the electronic device 104. For example, one or more of the device components 124 may be a PCB that is configured to control a function of the electronic device 104. The PCB may include contacts (not shown) for conducting electrical signals and/or detecting an actuation of a switch.

The enclosure 108 may be constructed from a set of layers. As shown in FIG. 2, the enclosure 108 includes an internal component 128, an interstitial material 132, and an enclosure component 136. The enclosure component 136 is shown proximal to the exterior surface 150 of the enclosure 108 and the internal component 128 is shown proximal to, or at, an interior volume defined by the enclosure 108. As shown in FIG. 2, the enclosure 108 may optionally include an exterior layer 140. The exterior layer 140 may be a cover glass formed from sapphire, conundrum, silica, or the like that may define the exterior surface 150. In some cases, as described with respect to FIG. 3, the exterior layer 140 may extend over the enclosure component 136 and the display 112. Additionally or alternatively, the exterior layer 140 may be defined partially or fully by a coating, paint, ink or other material that may provide a protective seal, decorative trim, or the like disposed on, or over, enclosure component 136.

In an embodiment, the enclosure component 136 may be constructed entirely, or partially, from aluminum or various aluminum alloys (e.g., including aluminum-based compounds having one or more of silicon, iron, copper, manganese, magnesium, or other appropriate elements). In some cases, the aluminum may be an anodized aluminum structure. The enclosure component 136 may be shaped in any appropriate manner for a given application, including linear and non-linear shapes. In some instances, the enclosure component 136 may be substantially planar and may resemble a plate or a sheet structure. The aluminum of the enclosure component 136 may have a melting temperature that is less than a melting temperature of the internal component 128 (e.g., where the internal component 128 is formed from steel or steel alloy). In some cases, the aluminum of the enclosure component 136 may have a melting temperature within a range of 800 degrees Fahrenheit to 1300 degrees Fahrenheit, based on the material composition of the aluminum. In other embodiments, the aluminum of the enclosure component 136 may have a melting temperature that is less than 800 degrees Fahrenheit or greater than 1300 degrees Fahrenheit.

The internal component 128 may be constructed entirely, or partially, from steel or various steel alloys (e.g., including steel-based compounds having one or more of silicon, chromium, manganese, nickel, titanium, copper, or other appropriate elements). The internal component 128 may be shaped in any appropriate manner for a given application, including linear and non-linear shapes. In some instances, the internal component 128 may be substantially planar and may resemble a plate or a sheet structure. In other cases, as described with respect to FIGS. 8A-10C, the internal component 128 may define a threaded feature, boss, plate, shield, rib, or other feature of the enclosure 108. In this regard, the internal component 128 may be a structural component of the enclosure 108 that is configured to secure a component of the electronic device 104, such as a PCB, to the enclosure component 136. In some cases, the internal component 128 may be configured to electrically conduct a signal received from the PCB.

The steel of the internal component 128 may have a melting temperature that is greater than the melting temperature of the enclosure component 136 (e.g., where the enclosure component 136 is formed from aluminum or aluminum alloy). In some cases, the steel of the internal component 128 may have a melting temperature within a range of 2600 degrees Fahrenheit to 2800 degrees Fahrenheit, based on the material composition of the steel. In other embodiments, the steel of the internal component 128 may have a melting temperature that is less than 2600 degrees Fahrenheit or greater than 2800 degrees Fahrenheit.

The interstitial material 132 may be positioned between the internal component 128 and the enclosure component 136. The interstitial material 132 may be used to define or form a blended melt layer between the internal component 128 and the enclosure component 136. In this manner, the internal component 128 and the enclosure component 136 may be affixed to one another via the interstitial material 132. As described in greater detail below (e.g., as described with respect to FIGS. 4A-4C), in one embodiment, a portion of the interstitial material 132 may be directly or chemically bonded with a portion of the internal component 128 at the blended melt layer (e.g., a region of the enclosure 108 at which heat is applied to melt the interstitial material 132, and optionally the enclosure component 136, without melting the internal component 128).

Figure 3:
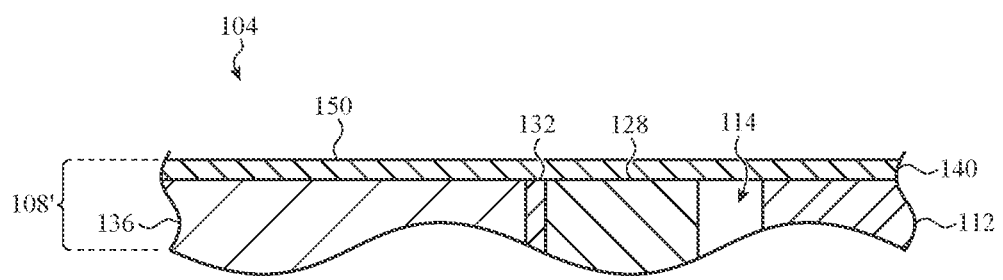
FIG. 3 depicts a cross-sectional view of the embodiment of the electronic device of FIG. 1, taken along line B-B of FIG. 1.

FIG. 3 is a cross-sectional view of the electronic device 104 of FIG. 1, taken along line B-B of FIG. 1. As illustrated, the electronic device 104 includes enclosure 108' and the display 112. The enclosure 108' shown and described with respect to FIG. 3 may be substantially analogous to the enclosure 108 described with respect to FIG. 2. For example, the enclosure 108' may include the enclosure component 136; the interstitial material 132; the internal component 128; and the exterior layer 140.

Notwithstanding the foregoing similarities to the enclosure 108, the enclosure 108' may be configured such that both the enclosure component 136 and the internal component 128 are positioned proximal to the exterior surface 150 of the enclosure 108. As shown in FIG. 3, the internal component 128 may form a portion of the enclosure 108' and may be separated from the display 112 by an opening 114. The opening 114 may be formed by the enclosure 108 and configured to receive the display 112. This may facilitate attachment of the display 112 to the device components 124. The exterior layer 140 may be a cover glass or other transparent, or partially transparent, layer that defines at least a portion of the exterior surface 150. In this regard, the exterior layer 140 may extend over the enclosure component 136, the interstitial material 132, the internal component 128, the opening 114, and the display 112. Accordingly, the exterior layer 140 may form a cosmetic layer and/or a function component of the electronic device 104, such as by forming a transparent and protective layer over the display 112.

Figure 4A:
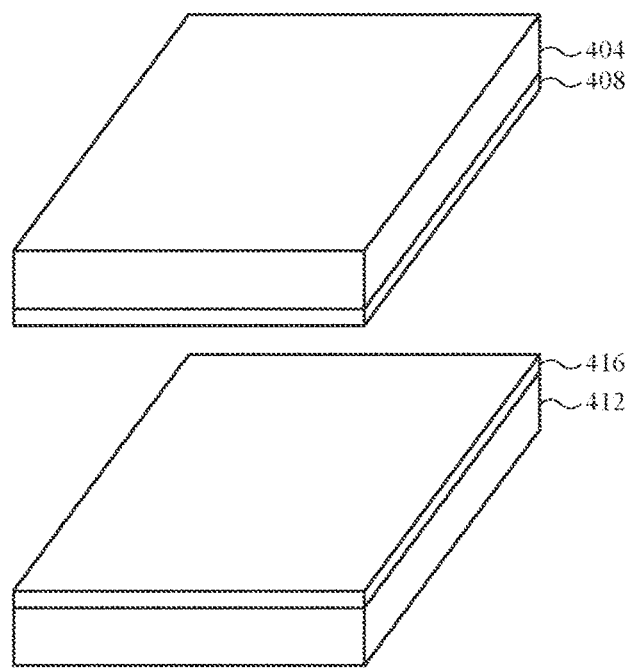
FIG. 4A depicts an enclosure component having a first interstitial material and an internal component having a second interstitial material.

FIG. 4A illustrates a first component 404 and a second component 412 prior to affixing the first component 404 and the second component 412 to create a composite structure. The first component 404 is shown as having a first interstitial material 408. The second component 412 is shown as having a second interstitial material 416. The first component 404 and the second component 412 may be substantially analogous to the enclosure component 136 and the internal component 128, respectively, described above with respect to FIGS. 1-3. However, it will be appreciated that the first and second components 404, 412 may be substantially components of the electronic device 104 described above, including embodiments in which the first and second components 404, 412 are substantially analogous to the internal component 128 and the enclosure component 136, respectively.

In one embodiment, the first and second interstitial materials 408, 416 may be constructed entirely, or partially, from nickel or various nickel alloys (e.g., including nickel-based compounds having one or more of chromium, cobalt, iron, titanium, tungsten, molybdenum, or other appropriate elements). Additionally or alternatively, the first and second interstitial materials 408, 416 may be constructed entirely, or partially, from zinc (e.g., Zn), or various zinc alloys (e.g., including zinc-based compounds having one or more of copper, nickel, silver, aluminum, magnesium, lead, or other appropriate elements). In other embodiments, the first and second interstitial materials 408, 416 may be constructed from one or more aluminum alloys.

The first and second interstitial materials 408, 416 may have a melting temperature that is less than a melting temperature of the second component 412. For example, where the first and second interstitial materials 408, 416 are constructed from nickel, the first and second interstitial materials 408, 416 may have a melting temperature substantially within a range of 1600 degrees Fahrenheit to 2700 degrees Fahrenheit. In other cases, where the first and second interstitial materials 408, 416 are constructed from zinc, the first and second interstitial materials 408, 416 may have a melting temperature substantially within a range of 750 degrees Fahrenheit to 1750 degrees Fahrenheit. The first and second interstitial materials 408, 416 need not be constructed from the same materials. For instance, the first and second interstitial materials 408, 416 may be constructed from different alloys. Accordingly, the first and second interstitial materials 408, 416 may have different melting temperatures, as may be appropriate for a given application.

The first interstitial material 408 may be affixed to the first component 404. In one embodiment, the first interstitial material 408 may be plated, cladded, and/or coated onto a surface of the first component 404. In other embodiments, other techniques for affixing the first interstitial material 408 to the first component 404 are contemplated within the scope of the present disclosure. The first interstitial material 408 is affixed to the first component 404 prior to the affixing of the first component 404 and the second component 412 to create a composite structure. The combination of the first component 404 and the first interstitial material 408 may therefore define a non-separable structure that is affixed to the second component 412 within the composite structure.

The second interstitial material 416 may be affixed to the second component 412. In one embodiment, the second interstitial material 416 may be plated, cladded, and/or coated onto a surface of the second component 412. In other embodiments, other techniques for affixing the second interstitial material 416 to the second component 412 are contemplated within the scope of the present disclosure. The second interstitial material 416 is affixed to the second component 412 prior to the affixing of the first component 404 to the second component 412 to create a composite structure. The combination of the second component 412 and the second interstitial material 416 may therefore define a non-separable structure that is affixed to the first component 404 within the composite structure.

Figure 4B:
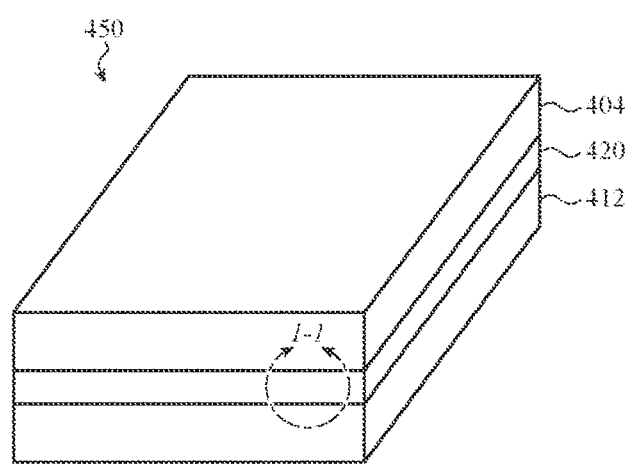
FIG. 4B depicts a composite structure including the enclosure component and the internal component of FIG. 4A and having a blended melt layer.

FIG. 4B shows the first component 404 and the second component 412 combined to form a composite structure 450. The composite structure 450 may be formed via a coupling process that affixes the first component 404 to the second component 412, according to the embodiments described herein (e.g., as described with respect to FIGS. 4C and 7). The composite structure 450 may include a blended melt layer 420. As described with respect to FIG. 4C, the blended melt layer 420 may be formed from a portion of one or more of the material of the first component 404 and the first and second interstitial materials 408, 416. The blended melt layer 420 may be positioned between the first component 404 and the second component 412. The blended melt layer 420 may be affixed to both the first component 404 and the second component 412. In this regard, the first component 404 may be affixed to the second component 412 via the blended melt layer 420.

Figure 4C:
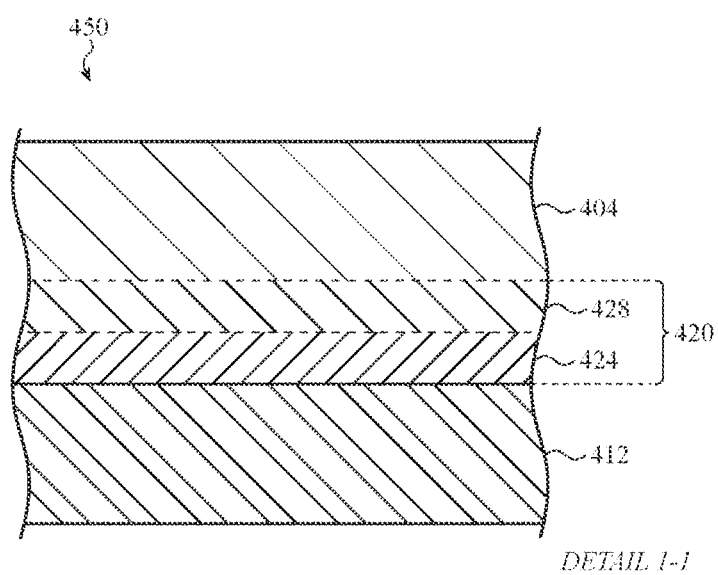
FIG. 4C depicts an enlarged view of the composite structure of FIG. 4B.

FIG. 4C depicts detail 1-1 of FIG. 4B of the composite structure 450. As shown in the non-limiting example of FIG. 4C, the blended melt layer 420 may include a diminished interstitial material 424 and a transition layer 428. The diminished interstitial material 424 and the transition layer 428 may be at least partially formed from (with reference to FIG. 4A) the interstitial materials 408, 416 as a result of the coupling processes described herein.

In one embodiment, a coupling process may involve positioning the first component 404 and the second component 412 such that the interstitial materials 408, 416 abut. The coupling process may heat the first component 404, the second component 412, and the first and second interstitial materials 408, 416 (or portions or combinations thereof) to a bonding temperature that melts a portion of the material that forms the first component 404 and a portion of one, or both, of the first and second interstitial materials 408, 416. Melting the portion of the first component 404 and the portion of one, or both, of the first and second interstitial materials 408, 416 may form the transition layer 428. As such, the transition layer 428 may include a region of the composite structure 450 at which portions of the first component 404 are directly or chemically bonded to the elements of the first or second interstitial materials 408, 416. The diminished interstitial material 424 may be formed from the portion of one, or both, of the first and second interstitial materials 408, 416, for example, that may not be melted or otherwise formed into the transition layer 428. The diminished interstitial material 424 may not include material from the second component 412; as the second component is not melted, the diminished interstitial material 424 may remain affixed to the second component 412, but not melted or blended together.

The coupling process may cause the first component 404 to affix to the transition layer 428. For example, the coupling process may melt the first component 404 at or near the surface of the first component 404 where the first interstitial material 408 is positioned. The melted portion of the first component 404 may therefore melt into, and form with, one or both of the first and second interstitial materials 408, 416 to form the composite structure 450. The portion of the first component 404 not melted as a result of the coupling process may therefore be affixed with the transition layer 428 upon the cooling of the composite structure 450. The first component 404 depicted in FIG. 4C thus may be smaller than, or diminished from, the first component 404 depicted in FIG. 4A.

In a similar manner, the coupling process may cause the diminished interstitial material 424 to be affixed with the transition layer 428. As one example, a portion of the second interstitial material 416 may be melted into, and formed with, the transition layer 428. The portion of the second interstitial material 416 not melted as result of the coupling process may therefore be affixed with the transition layer 428 upon the cooling of the composite structure 450. The diminished interstitial material 424 deposited in FIG. 4C may therefore be smaller than, or diminished from, the second interstitial material 416 depicted in FIG. 4A.

It will be appreciated that, in some embodiments, the blended melt layer 420 need not include the diminished interstitial material 424. For example, the blended melt layer 420 may be substantially defined by the transition layer 428. This may occur where substantially all of the first and second interstitial materials 408, 416 are melted as a result of the coupling process.

Alternatively, the blended melt layer 420 need not include the transition layer 428. For example, the blended melt layer 420 may be substantially defined by the diminished interstitial material 424. This may occur where the first component 404 is not melted as a result of the coupling process. For example, rather than melt the first component 404, the coupling process may melt a portion of each of the first and second interstitial materials 408, 416 to define the blended melt layer 420. Stated differently, the first interstitial material 408 may be directly or chemically bonded to the second interstitial material 416, thereby affixing the first component 404 to the second component 412 without melting the first component 404 or the second component 412.

As illustrated in FIG. 4C, the diminished interstitial material 424 is affixed to the second component 412. The interface between the diminished interstitial material 424 and the second component 412 may be substantially the same as the interface between the second interstitial material 416 and the second component 412 depicted in FIG. 4A. In this manner, the diminished interstitial material 424 may be affixed to the second component 412 within the composite structure 450 via a plating, cladding, or other appropriate bonding technique. The coupling process may not melt the second component 412 (e.g., the bonding temperature utilized in the coupling process may be less than a melting temperature of the second component 412). Accordingly, the second component 412 may be substantially the same size and shape as the second component 412 depicted in FIG. 4A.

Figure 5A:
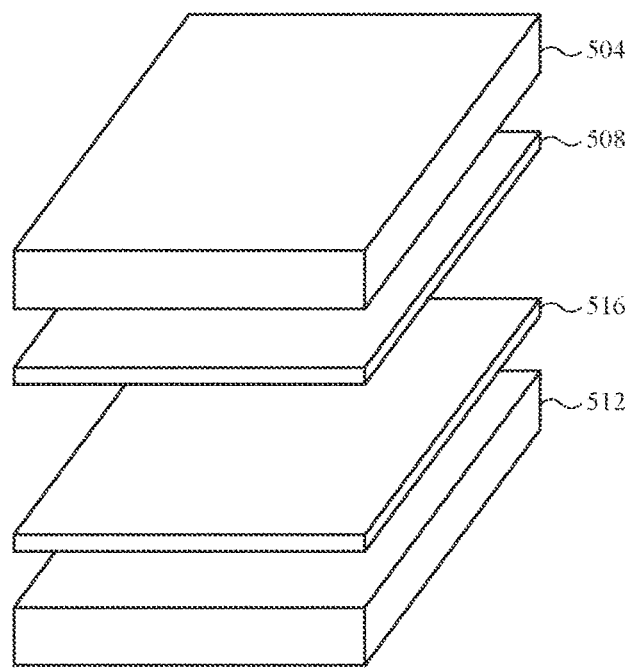
FIG. 5A depicts an enclosure component and an internal component having interstitial sheets positioned therebetween.

FIG. 5A illustrates a first component 504 and a second component 512 prior to affixing the first component 504 and the second component 512 to create a composite structure. The first component 504 is shown as positioned adjacent a first interstitial sheet 508. The second component 512 is shown positioned adjacent a second interstitial sheet 516. The first component 504 and the second component 512 may be substantially analogous to the enclosure component 136 and the internal component 128, respectively, described above with respect to FIGS. 1-3. However, it will be appreciated that the first and second components 504, 512 may be substantially components of the electronic device 104 described above, including embodiments in which the first and second components 504, 512 are substantially analogous to the internal component 128 and the enclosure component 136, respectively.

The first and second interstitial sheets 508, 516 may be substantially analogous to the first and second interstitial materials 408, 416 described above with respect to FIGS. 4A-4C. For example, the first and second interstitial sheets 508, 516 may be formed from various metallic elements, including nickel, zinc, and aluminum alloy and have a melting temperature that is less than a melting temperature of the second component 512. Notwithstanding the foregoing, the first and second interstitial sheets 508, 516 may be a film, laminate, sheet, and/or other conforming or substantially planar layer that may be applied to one or both of the first and second components 504, 512. In some cases, the first and second interstitial sheets 508, 516 may be used to augment or otherwise tailor a volume of interstitial material used to form a composite structure from the first and second components 504, 512. Additionally or alternatively, the first and second interstitial sheets 508, 516 may be configured to conform to (and at least partially fill) irregularities or other surface imperfections within the first and second components 504, 512 that may otherwise impede bonding.

Figure 5B:
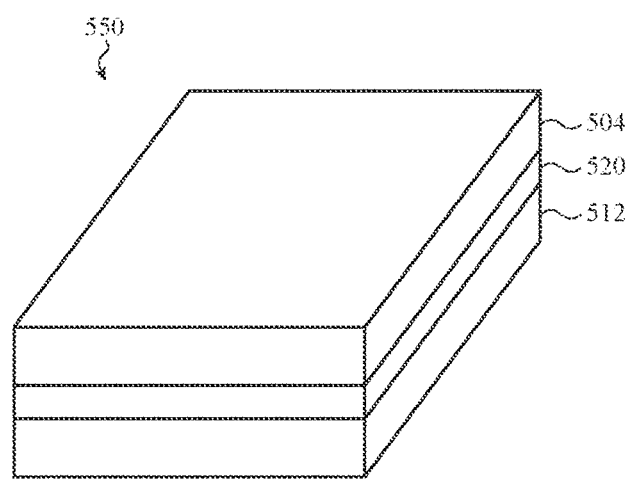
FIG. 5B depicts a composite structure including the enclosure component and the internal component of FIG. 5A and having a blended melt layer.

FIG. 5B shows the first component 504 and the second component 512 combined to form a composite structure 550. The composite structure 550 may be formed via a coupling process that affixes the first component 504 to the second component 512, according to the embodiments described herein (e.g., as described with respect to FIGS. 4C and 7). The composite structure 550 may include a blended melt layer 520. The blended melt layer 520 may be positioned between the first component 504 and the second component 512. The blended melt layer 520 may be attached to both the first component 504 and the second component 512. In this regard, the first component 504 may be affixed to the second component 512 via the blended melt layer 520.

The composite structure 550 may be constructed in a manner substantially analogous to the composite structure 450 depicted in FIGS. 4A-4C. For example, the composite structure 550 may be constructed using the coupling process described with respect to FIG. 4C. Notwithstanding the foregoing similarities, the blended melt layer 520 may be at least partially defined by one or more of the first and second interstitial sheets 508, 516. To illustrate, the coupling process may involve positioning the first component 504 and the second component 512 such that the first and second interstitial sheets 508, 516 abut. The coupling process may heat the first component 504, the second component 512, and the first and second interstitial sheets 508, 516 (or portions or combinations thereof) to a bonding temperature. This may cause a portion of the first component 504 and a portion of one, or both, of the first and second interstitial sheets 508, 516 to melt. Melting the portion of the first component 504 and the portion of one, or both, of the first and second interstitial sheets 508, 516 may partially form the blended melt layer 520. This may allow the first component 504 and the first and second interstitial sheets 508, 516 to be affixed to one another via direct or chemical bonding. The bonding temperature may be less than a melting temperature of the second component 512. In this regard, the second component 512 may be affixed to the blended melt layer 520 (and thus to the first component 504), rather than being partially melted into the blended melt layer 520.

Figure 6A:
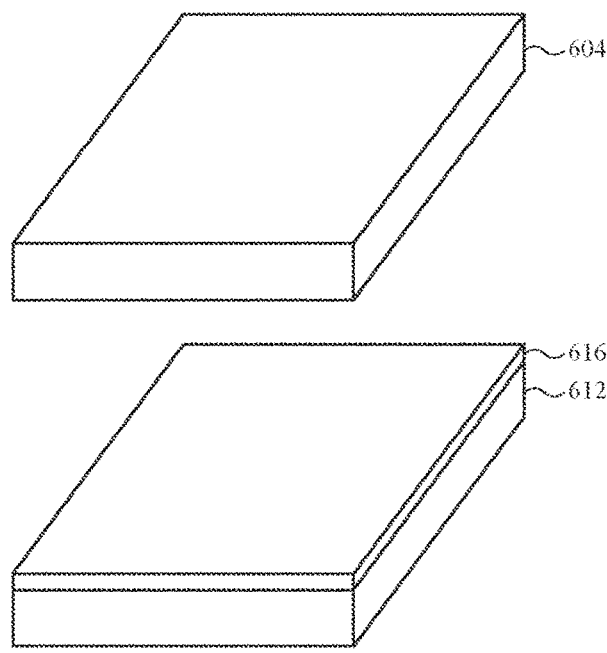
FIG. 6A depicts an enclosure component and an internal component having a interstitial material.

FIG. 6A illustrates a first component 604 and a second component 612 prior to affixing the first component 604 and the second component 612 to create a composite structure. The second component 612 is shown as having a interstitial material 616. The first component 604 and the second component 612 may be substantially analogous to the enclosure component 136 and the internal component 128, respectively, described above with respect to FIGS. 1-3. However, it will be appreciated that the first and second components 604, 612 may be substantially components of the electronic device 104 described above, including embodiments in which the first and second components 604, 612 are substantially analogous to the internal component 128 and the enclosure component 136, respectively.

The interstitial material 616 may be affixed to the second component 612 in the same manner as (with reference to FIG. 4A) the second interstitial material 416 is affixed to the second component 412. For example, the interstitial material 616 may be plated, cladded, coated or otherwise affixed to the second component 612.

Figure 6B:
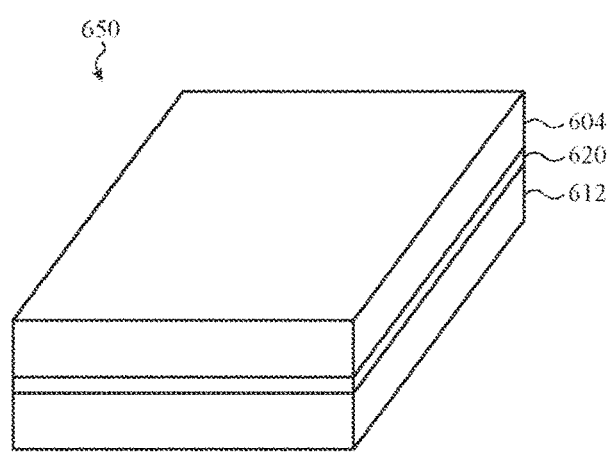
FIG. 6B depicts a composite structure including the enclosure component and the internal component of FIG. 6A and having a blended melt layer.

FIG. 6B shows the first component 604 and the second component 612 combined to form a composite structure 650. The composite structure 650 may be formed via a coupling process that affixes the first component 604 to the second component 612, according to the embodiments described herein (e.g., as described with respect to FIGS. 4C and 7). The composite structure 650 may include a blended melt layer 620. The blended melt layer 620 may be positioned between the first component 604 and the second component 612. The blended melt layer 620 may be attached to both the first component 604 and the second component 612. In this regard, the first component 604 may be affixed to the second component 612 via the blended melt layer 620.

The composite structure 650 may be constructed in a manner substantially analogous to the composite structure 450 depicted in FIGS. 4A-4C. For example, the composite structure 650 may be constructed using the coupling process described with respect to FIG. 4C. Notwithstanding the foregoing similarities, the blended melt layer 620 may be at least partially defined by the interstitial material 616. To illustrate, the coupling process may involve positioning the first component 604 and the second component 612 such that the interstitial material 616 and the first component 604 abut. The coupling process may heat the first component 604, the second component 612, and the interstitial material 616 (or portions or combinations thereof) to a bonding temperature. This may cause a portion of the first component 604 and a portion of the interstitial material 616 to melt. Melting the portion of the first component 604 and the portion of the interstitial material 616 may partially form the blended melt layer 620. This may allow the first component 604 and the interstitial material 616 to be affixed to one another via direct or chemical bonding. The bonding temperature may be less than a melting temperature of the second component 612. In this regard, the second component 612 may be affixed to the blended melt layer 620 (and thus to the first component 604), rather than being partially melted into the blended melt layer 620.

In an embodiment, various ultrasonic bonding techniques may be used to affix two dissimilar materials via an interstitial material. For example, a bonding tool, ultrasonic transducer, or appropriate tool may induce rotational and/or axial movement in at least one of the dissimilar materials that causes the interstitial material to melt, and establish a molecular bond between the dissimilar materials.

Figure 7:
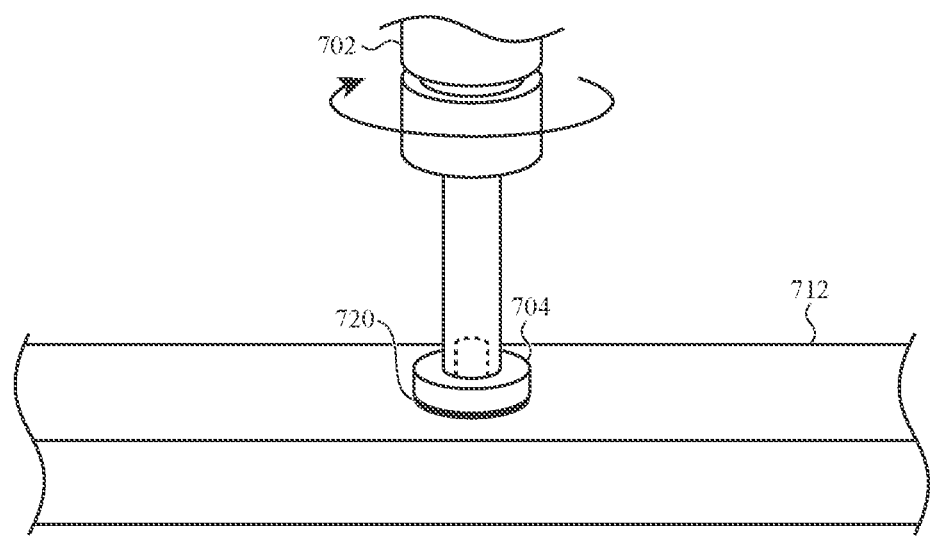
FIG. 7 depicts a sample bonding tool rotating an internal component to form a bond between the internal component and an enclosure component.

In this regard, FIG. 7 depicts a bonding operation that may be used to form a composite structure of dissimilar materials using an ultrasonic bonding tool. As illustrated, the bonding operation includes a bonding tool 702. The bonding tool 702 may be an ultrasonic transducer or other rotary tool designed for high speed rotational movement and may be capable of performing a rotational interstitial welding operation. For example, the bonding tool 702 may rotate or oscillate in a generally circular direction about a longitudinal direction of the bonding tool 702 while compressing one or more materials positioned along the longitudinal axis. The bonding tool 702 may rotate or oscillate according to a predetermined frequency that is configured to heat a bonding region between the dissimilar materials. Sample frequencies for the operation of the bonding tool 702 include 15 kHz, 20 kHz, 30 kHz, 35 kHz, 40 kHz, and 70 kHz; however, it will be appreciated that other frequencies are contemplated.

The bonding tool 702 may be releasably coupled with an internal component 704. For example, the internal component 704 may be temporarily affixed to the bonding tool 702 during axial and/or rotational movement of the bonding tool 702, and subsequently disengaged (e.g., after cessation of the axial and/or rotational movement). In this regard, as shown in FIG. 7, a portion of the internal component 704 may be received by the bonding tool 702. This engagement of the internal component 704 and the bonding tool 702 may therefore cause the internal component 704 to rotate and/or translate in response to corresponding rotational or axial movements of the bonding tool 702. In an embodiment, the internal component 704 may be any appropriate metal structure, as described herein, including being constructed from titanium, steel, or other metal or metal alloys. In other cases, the internal component 704 may be constructed from other materials.

The bonding tool 702 may press the internal component 704 to abut an interstitial material 720. The interstitial material 720 may be a foil or a sheet constructed from tin, aluminum or other material having a lower melting point than that of the internal component 704, including zinc and nickel, as described herein. The interstitial material 720 may have a thickness that is substantially less than the thickness of the internal component 704.

The interstitial material 720 may be positioned on an exterior surface of an enclosure component 712. The enclosure component 712 may be any appropriate ceramic component, including being constructed from zirconia aluminum ($ZrO_2Al_2O_3$), zirconia ($ZrO_2$), or other ceramic-based material. In other cases, the enclosure component 712 may be an aluminum or aluminum alloy structure. For some cases, the enclosure component 712 may form an outer casing or shell of an electronic device housing, such as for the electronic device 104 described with respect to FIGS. 1-3. In an embodiment, the enclosure component 712 may be constructed from a ceramic or ceramic-based material.

In operation, the bonding tool 702 may move the internal component 704 towards the enclosure component 712 so as to compress the interstitial material 720 between the internal component 704 and the enclosure component 712. Subsequently, the bonding tool 702 may cause the internal component 704 to rotate relative to the interstitial material 720 and enclosure component 712 while maintaining the compression of the interstitial material 720 between the internal component 704 and the enclosure component 712. The rotation of the internal component 704 by the bonding tool 702 may generate heat within the interstitial material 720 and surrounding portions of the internal component 704 and the enclosure component 712. This may cause a portion of the interstitial material 720 to melt and form a molecular bond with one or both of the internal component 704 and/or the enclosure component 712.

The bonding tool 702 may continue to translate and rotate the internal component 704 until a sufficient bond strength is reached that causes the internal component 704 and the enclosure component 712 to permanently affix to one another. Upon completion of the bonding, the bonding tool 702 may be disengaged from the internal component 704.

FIGS. 8A-10C depict various electronic devices having composite structures. Broadly, the composite structures described above with respect to FIGS. 1-7 may be used to form various components of an electronic device. For example, the composite structures may be used to form a portion of an enclosure, housing, or other feature of an electronic device. In some cases, as described in greater detail below, the composite structures may include an enclosure component that forms a wall or surface of a device enclosure and an internal component that forms a structural member of the enclosure (e.g., a threaded connection, a structural rib, and so on). The enclosure component and the internal component may be affixed to one another, as described herein, such that the structural member may be bonded with the wall or surface of the enclosure.

Figure 8A:
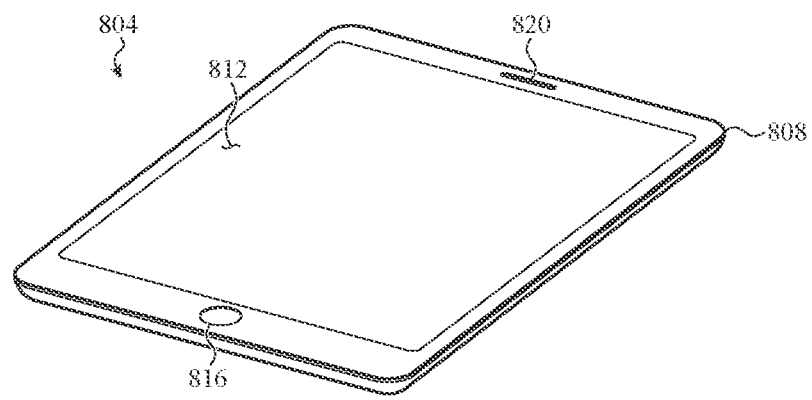
FIG. 8A depicts another embodiment of a sample electronic device including a composite structure.

FIG. 8A depicts an example electronic device 804. The electronic device 804 may include, or be formed from, a composite structure, such as the composite structures 450, 550, 650 described above with respect to FIGS. 4A-6B. As shown in FIG. 8A, the electronic device 804 may be a portable electronic device, such as a mobile phone, tablet computer, or other computing device having a touch-sensitive display positioned within an enclosure or housing. In other embodiments, as described herein, the electronic device 804 may be substantially any type of electronic device having an enclosure component affixed to an internal component via an interstitial material.

For purposes of illustration, electronic device 804 is shown having an enclosure 808, a display 812, one or more input/output members 816, and a speaker 820. It should be noted that the electronic device 804 may also include various other components, such as one or more ports (e.g., charging ports, data transfer ports, or the like), additional input/output buttons, and so on. As such, the discussion of any electronic device, such as electronic device 804, is meant as illustrative only.

The enclosure 808 may be formed from various combinations of composite structures, for example, such as from various combinations of enclosure and internal components affixed to one another using an interstitial material. In one embodiment, one or more walls of the enclosure 808 may be substantially formed from an enclosure component formed from an enclosure material that defines or encloses an internal volume. An internal component (not shown in FIG. 8A) formed from a metal material that is different than the enclosure material may be affixed to the enclosure component within the interior volume via an interstitial material, thereby forming a composite structure.

Figure 8B:
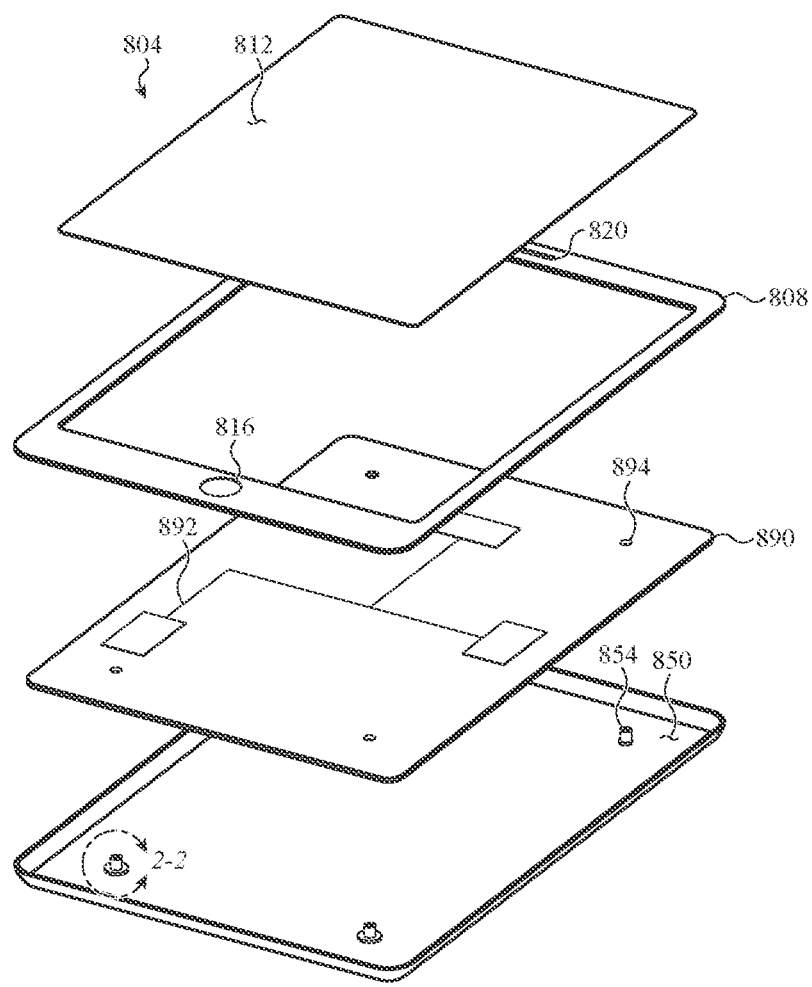
FIG. 8B depicts an exploded view of the sample electronic device of FIG. 8A.

FIG. 8B depicts an exploded view of an embodiment of the electronic device 804 shown in FIG. 8A. In the exploded view, for purposes of illustration, the enclosure 808 is shown separated into a top portion and a bottom portion. However, it will be appreciated that the enclosure 808 may be a substantially integrally formed or unitary structure or, alternatively, may include multiple separable pieces that collectively define the enclosure 808.

As described above, the enclosure 808 may be formed partially or fully from an enclosure component and an internal component that form a composite structure. For example, the enclosure 808 may include an interior surface 850 formed from an enclosure material. Internal components may be affixed to the enclosure component along the interior surface 850. For example, as shown in FIG. 8B, threaded features 854 may be affixed to the interior surface 850. The threaded features 854 affixed to the interior surface 850 may form a composite structure, as described herein. For example, the threaded features 854 may be an internal component of the enclosure 808 and substantially formed from a metal material that is affixed (via an interstitial material) to the enclosure material that forms the interior surface 850. The threaded features 854 may be mounting features, bosses, or other structural members that are used to connect or secure one or more components of the electronic device 804 to the enclosure 808.

In this regard, as shown in FIG. 8B, the electronic device 804 may include a printed circuit board (PCB) 890. The PCB 890 may include electrical components 892 (e.g., processing units, switches, sensors, wires, or the like) that control one or more functions of the electronic device 804. The PCB 890 may be secured to the interior surface 850 of the enclosure 808 using the threaded features 854. For example, the PCB 890 may define openings 894. The threaded features 854 may be advanced through respective ones of the openings 894 such that the PCB 890 is secured to enclosure 808.

Figure 8C:
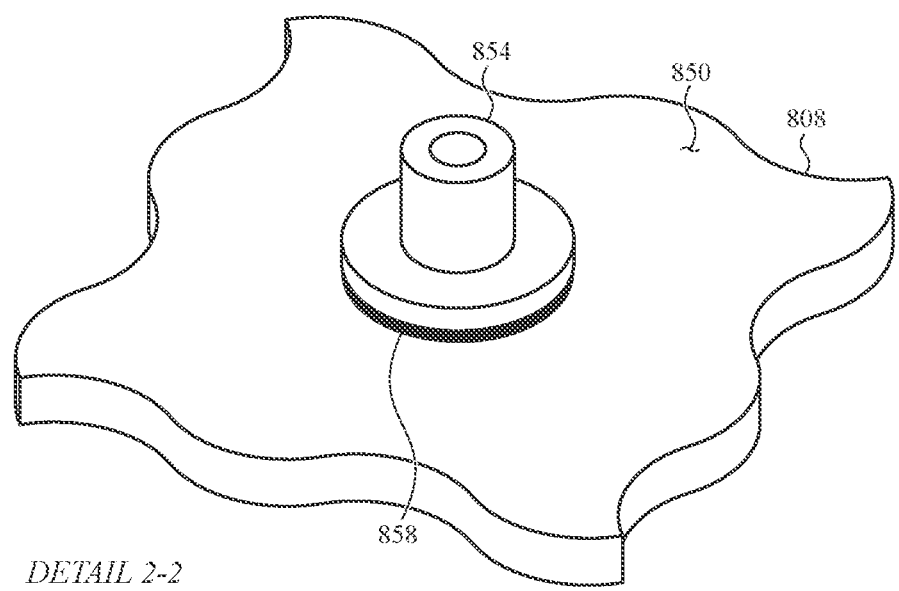
FIG. 8C depicts an enlarged view of the composite structure of FIG. 8B.

FIG. 8C depicts detail 2-2 of FIG. 8B of the interior surface 850. As shown in the non-limiting example of FIG. 8C, one of the threaded features 854 is affixed to the interior surface 850. The threaded features 854 shown in FIG. 8B may be affixed to the interior surface 850 via an interstitial materials 858. The interstitial material 858 may define a bonding region that affixes the threaded features 854 and the interior surface 850. For example, the interstitial material 858 may include a plated, cladded, or coated interstitial material (e.g., including zinc, nickel, aluminum alloy, or the like) that bonds the metal material of the threaded feature 854 to the enclosure material of the interior surface 850 as a result of a coupling process. The coupling process may involve melting a portion of the metal material and the interstitial material and/or applying a localized compression force to the internal and enclosure components. It will be appreciated that the interstitial material 858 may have a thickness that is substantially less than a thickness of the enclosure 808 or the threaded feature 854, and is therefore depicted in FIG. 8C for purposes of illustration only.

Figure 9A:
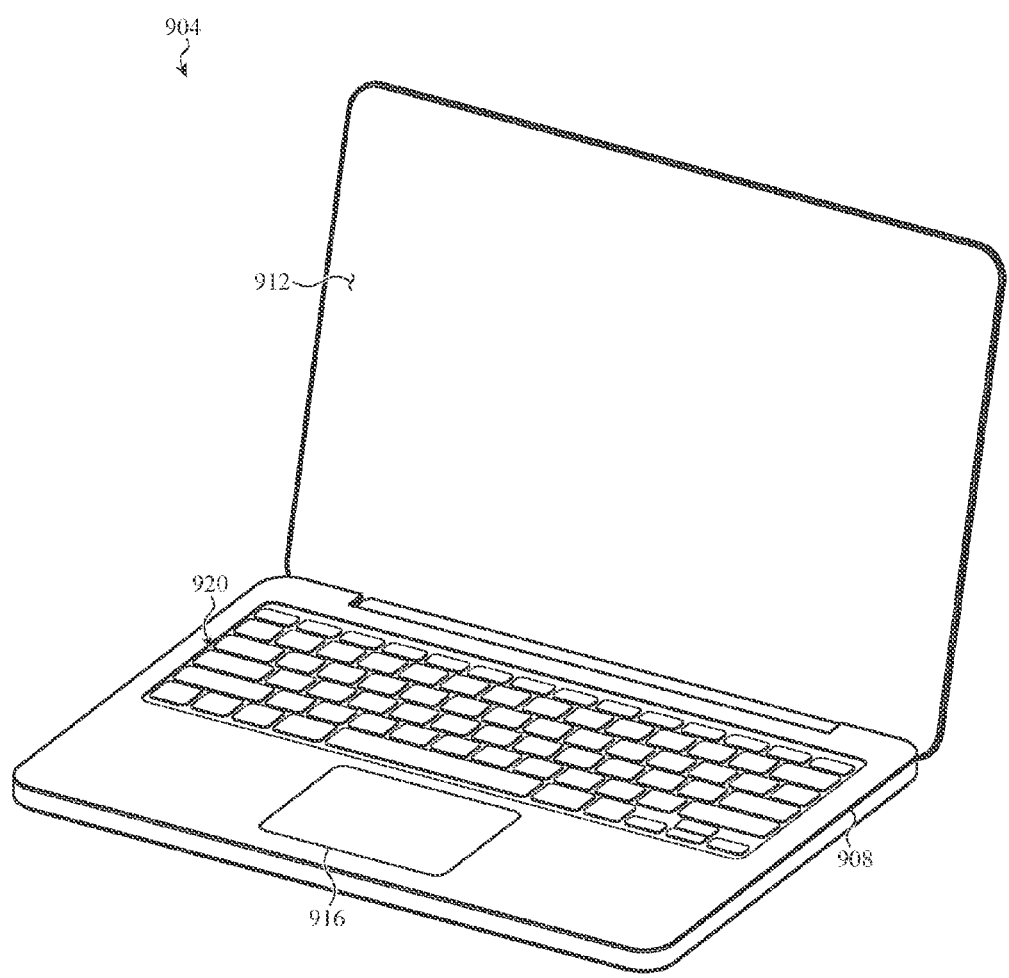
FIG. 9A depicts another embodiment of a sample electronic device including a composite structure.

FIG. 9A depicts an example electronic device 904. The electronic device 904 may include, or be formed from, a composite structure, such as the composite structures 450, 550, 650 described above with respect to FIGS. 4A-6B. As shown in FIG. 9A, the electronic device 904 may be a laptop computer. In other embodiments, as described herein, the electronic device 904 may be substantially any type of electronic device having an enclosure component affixed to an internal component via an interstitial material.

For purposes of illustration, electronic device 904 is shown having an enclosure 908, a display 912, one or more input/output members 916, and a keyboard assembly 920. It should be noted that the electronic device 904 may also include various other components, such as one or more ports (e.g., charging ports, data transfer ports, or the like), additional input/output buttons, and so on. As such, the discussion of any electronic device, such as electronic device 904, is meant as illustrative only.

The enclosure 908 may be formed from various combinations of composite structures, for example, such as from various combinations of enclosure and internal components affixed to one another using an interstitial material. In one embodiment, one or more walls of the enclosure 908 may be substantially formed from an enclosure component formed from an enclosure material that defines or encloses an internal volume. An internal component (not shown in FIG. 9A) formed from a metal material that is different than the enclosure material may be affixed to the enclosure component within the interior volume via an interstitial material, thereby forming a composite structure.

Figure 9B:
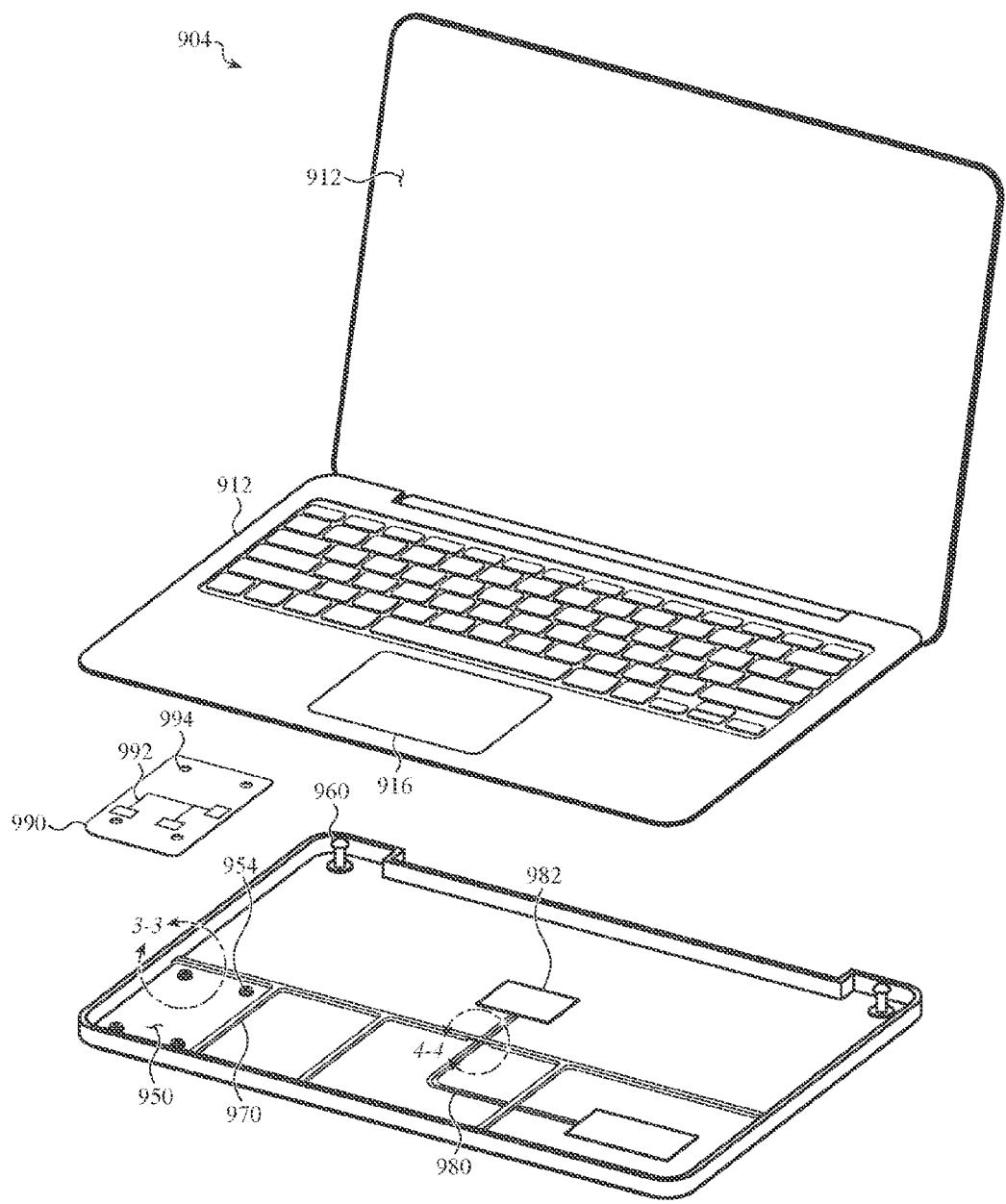
FIG. 9B depicts an exploded view of the sample electronic device of FIG. 9A.

FIG. 9B depicts an exploded view of an embodiment of the electronic device 904 shown in FIG. 9A. In the exploded view, for purposes of illustration, the enclosure 908 is shown separated into a top portion and a bottom portion. However, it will be appreciated that the enclosure 908 may be a substantially integrally formed or unitary structure or, alternatively, may include multiple separable pieces that collectively define the enclosure 908.

As described above, the enclosure 908 may be formed partially or fully from an enclosure component and an internal component that form a composite structure. For example, the enclosure 908 may include an interior surface 950 formed from an enclosure material. Various internal components may be affixed to the enclosure component along the interior surface 950

As one example, shown in FIG. 9B, threaded features 954 may be affixed to the interior surface 950. The threaded features 954 affixed to the interior surface 950 may form a composite structure, as described herein. For example, the threaded features 954 may be an internal component of the enclosure 908 and substantially formed from a metal material that is affixed (via an interstitial material) to the enclosure material that forms the interior surface 950. The threaded features 954 may be mounting features, bosses, or the like that are used to connect or secure one or more components of the electronic device 904 to the enclosure 908.

In this regard, as shown in FIG. 9B, the electronic device 904 may include a printed circuit board (PCB) 990. The PCB 990 may include electrical components 992 (e.g., processing units, switches, sensors, wires, or the like) that control one or more functions of the electronic device 904. The PCB 990 may be secured to the interior surface 950 of the enclosure 908 using the threaded features 954. For example, the PCB 990 may define openings 994. The threaded features 954 may be advanced through respective ones of the openings 994 such that the PCB 990 is secured to enclosure 908.

The electronic device 904 may include various other composite structures. As shown in FIG. 9B, the electronic device 904 may include an internal component that defines ribs 970 that are affixed to the interior surface 950. The ribs 970 affixed to the interior surface 950 may form a composite structure, as described herein. For example, the ribs 970 may be an internal component of the enclosure 908 and substantially formed from a metal material that is affixed (via an interstitial material) to the enclosure material that forms the interior surface 950. The ribs 970 may be structural ribs that enhance or provide rigidity to the enclosure 908, such as providing rigidity to an exterior surface of the enclosure 908.

The ribs 970 may extend across the interior surface 950 in multiple directions. For example, the ribs 970 may extend between sidewalls of the enclosure 908. In some cases, the ribs 970 separate an internal volume of the enclosure 908 into discrete compartments. These discrete compartments may be used to secure and/or separate various electronic components or other features of the electronic device 904, for example, such as the PCB 990. In this regard, as described in greater detail below with respect to FIG. 9D, the ribs 970 may define a passage that allows a set of wires 980 to extend between the discrete compartments of the internal volume of the enclosure 908.

As another example, as shown in FIG. 9B, the electronic device 904 may include an internal component that defines pins 960. The pins 960 affixed to the interior surface 950 may form a composite structure, as described herein. For example, the pins 960 may be substantially formed from a metal material that is affixed (via an interstitial material) to the enclosure material that forms the interior surface 950. The pins 960 may be structural members of the electronic device 904 that may, for example, connect the top and bottom portion of the enclosure 908.

As another example, as shown in FIG. 9B, the electronic device 904 may include an internal component that defines a shield 982. The shield 982 may be an electrically or thermally conductive element that shields or protects one or more components of the electronic device 904 from undesirable interference. For example, the shield 982 may be shield or protect one or more components of the electronic device 904 form electromagnetic radiation. The shield 982 affixed to the interior surface 950 may form a composite structure, as described herein. For example, the shield 982 may be substantially formed from a metal material that is affixed (via an interstitial material) to the enclosure material that forms the interior surface 950.

Figure 9C:
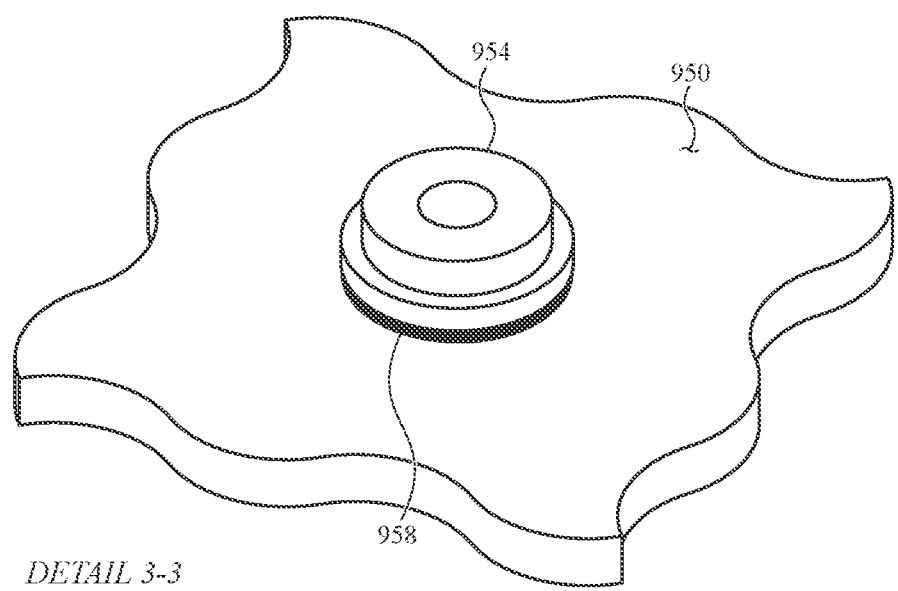
FIG. 9C depicts an enlarged view of the composite structure of FIG. 9B.

FIG. 9C depicts detail 3-3 of FIG. 9B of the interior surface 950. As shown in the non-limiting example of FIG. 9C, one of the threaded features 954 is affixed to the interior surface 950. The threaded features 954 shown in FIG. 9C may be affixed to the interior surface 950 via an interstitial material 958. The interstitial material 958 may define a bonding region that affixes the threaded feature 954 and the interior surface 950. For example, the interstitial material 958 may include a plated, cladded, or coated interstitial material (e.g., including zinc, nickel, aluminum alloy, or the like) that bonds the metal material of the threaded feature 954 to the enclosure material of the interior surface 950 as a result of a coupling process. The coupling process may involve melting a portion of the enclosure material and the interstitial material 958 and/or applying a localized compression force to the internal and enclosure components. It will be appreciated that the interstitial material 958 may have a thickness that is substantially less than a thickness of the enclosure 908 or the threaded feature 954, and is therefore depicted in FIG. 9C for purposes of illustration only.

Figure 9D:
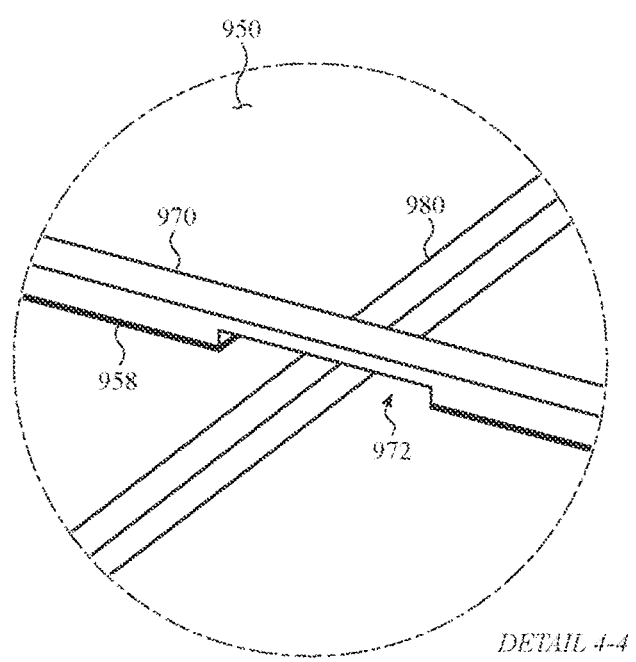
FIG. 9D depicts an enlarged view of another embodiment of the composite structure of FIG. 9B.

FIG. 9D depicts detail 4-4 of FIG. 9B of the interior surface 950. As shown in the non-limiting example of FIG. 9D, one of the ribs 970 is affixed to the interior surface 950. The ribs 970 shown in FIG. 9D may be affixed to the interior surface 950 via an interstitial material 958. As described above, the interstitial material 958 may define a bonding region that affixes the ribs 970 and the interior surface 950. For example, the interstitial material 958 may include a plated, cladded, or coated interstitial material (e.g., including zinc, nickel, aluminum alloy, or the like) that bonds the metal material of the ribs 970 to the enclosure material of the interior surface 950 as a result of a coupling process. The coupling process may involve melting a portion of the metal material and the interstitial material and/or applying a localized compression force to the internal and enclosure components. It will be appreciated that the interstitial material 958 may have a thickness that is substantially less than a thickness of the enclosure 908 or the ribs 970, and is therefore depicted in FIG. 9D for purposes of illustration only.

As described above, the ribs 970 may separate an internal volume of the enclosure 908 into discrete compartments. The discrete compartments may house or contain various electrical components, including PCB 990. In this regard, as shown in FIG. 9D, the ribs 970 may define a passage 972. The passage 972 may be a through portion or opening formed into a localized region of the ribs 970. The passage 972 may be configured to allow the set of wires 980 to extend between the discrete compartments of the internal volume of the enclosure 908. This may allow the ribs 970 to enhance the structural integrity of the enclosure 908 while facilitating electrical connections between the various electrical components of the electronic device 904.

Figure 10A:
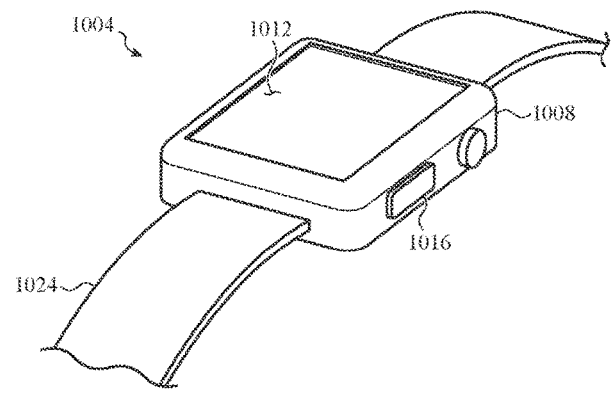
FIG. 10A depicts another embodiment of a sample electronic device including a composite structure.

FIG. 10A depicts an electronic device 1004. The electronic device 1004 may include, or be formed from, a composite structure, such as the composite structures 450, 550, 650 described above with respect to FIGS. 4A-6B. As shown in FIG. 10A, the electronic device 1004 may be a portable electronic device, such as a watch, or other computing device having a touch-sensitive display positioned within an enclosure or housing. In other embodiments, as described herein, the electronic device 1004 may be substantially any type of electronic device having an enclosure component affixed to an internal component via an interstitial material.

For purposes of illustration, the electronic device 1004 is shown having an enclosure 1008, a display 1012, one or more input/output members 1016, and a speaker band 1024. It should be noted that the electronic device 1004 may also include various other components, such as one or more ports (e.g., charging ports, data transfer ports, or the like), additional input/output buttons, and so on. As such, the discussion of any electronic device, such as electronic device 1004, is meant as illustrative only.

Figure 10B:
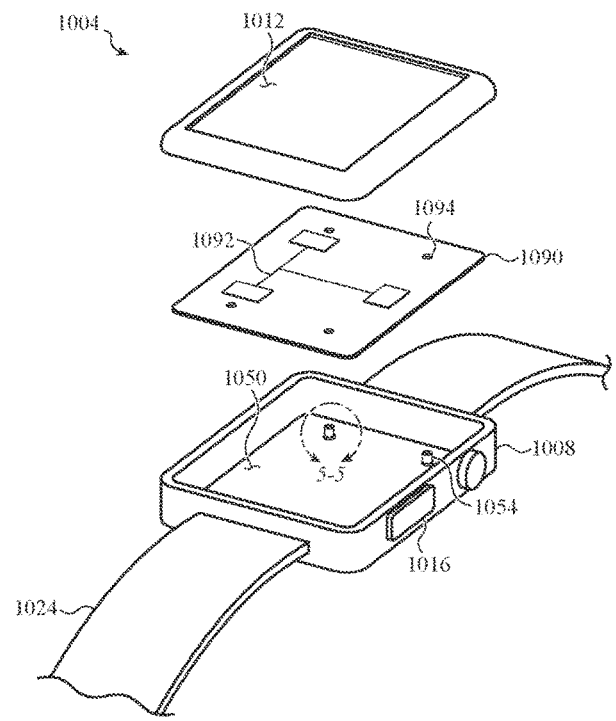
FIG. 10B depicts an exploded view of the sample electronic device of FIG. 10A.

The enclosure 1008 may be formed from various combinations of composite structures, for example, such as from various combinations of enclosure and internal components affixed to one another using an interstitial material. In one embodiment, one or more walls of the enclosure 1008 may be substantially formed from an enclosure component formed from an enclosure material that defines or encloses an internal volume. An internal component (not shown in FIG. 10A) formed from a metal material that is different than the enclosure material may be affixed to the enclosure component within the interior volume via an interstitial material, thereby forming a composite structure. FIG. 10B depicts an exploded view of an embodiment of the electronic device 1004 shown in FIG. 10A. In the exploded view, for purposes of illustration, the enclosure 1008 is shown separated into a top portion and a bottom portion. However, it will be appreciated that the enclosure 1008 may be a substantially integrally formed or unitary structure or, alternatively, may include multiple separable pieces that collectively define the enclosure 1008.

As described above, the enclosure 1008 may be formed partially or fully from an enclosure component and an internal component. For example, the enclosure 1008 may include an interior surface 1050 formed from an enclosure material. Internal components may be affixed to the enclosure component along the interior surface 1050. For example, as shown in FIG. 10B, threaded features 1054 may be affixed to the interior surface 1050. The threaded feature 1054 affixed to the interior surface 1050 may form a composite structure, as described herein. For example, the threaded features 1054 may be an internal component of the enclosure 1008 and substantially formed from a metal material that is affixed (via an interstitial material) to the enclosure material that forms the interior surface. The threaded features 1054 may be mounting features, bosses, or other structural members that are used to connect or secure one or more components of the electronic device 1004 to the enclosure 1008.

In this regard, as shown in FIG. 10B, the electronic device 1004 may include a printed circuit board (PCB) 1090. The PCB 1090 may include electrical components 1092 (e.g., processing units, switches, sensors, wires, or the like) that control one or more functions of the electronic device 1004. The PCB 1090 may be secured to the interior surface 1050 of the enclosure 1008 using the threaded features 1054. For example, the PCB 1090 may define openings 1094. The threaded feature 1054 may be advanced through respective ones of the openings 1094 such that the PCB 1090 is secured to enclosure 1008.

Figure 10C:
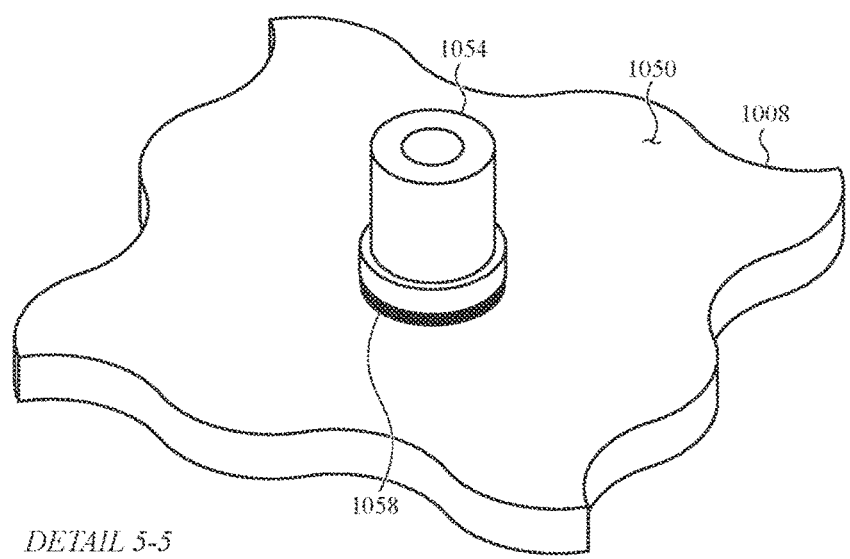
FIG. 10C depicts an enlarged view of the composite structure of FIG. 10A.

FIG. 10C depicts detail 5-5 of FIG. 10B of the interior surface 1050. As shown in the non-limiting example of FIG. 10C, one of the threaded features 1054 is affixed to the interior surface 1050. The threaded feature 1054 shown in FIG. 10B may be affixed to the interior surface 1050 via an interstitial material 1058. The interstitial material 1058 may define a bonding region that affixes the threaded feature 1054 and the interior surface 1050. For example, the interstitial material 1058 may include a plated, cladded, or coated interstitial material (e.g., including zinc, nickel, aluminum alloy, or the like) that bonds the metal material of the threaded feature 1054 to the enclosure material of the interior surface 1050 as a result of a coupling process. The coupling process may involve melting a portion of the enclosure material and the interstitial material and/or applying a localized compression force to the internal and enclosure components. It will be appreciated that the interstitial material 1058 may have a thickness that is substantially less than a thickness of the enclosure 1008 or the threaded feature 1054, and is therefore depicted in FIG. 10C for purposes of illustration only.

Figure 11:
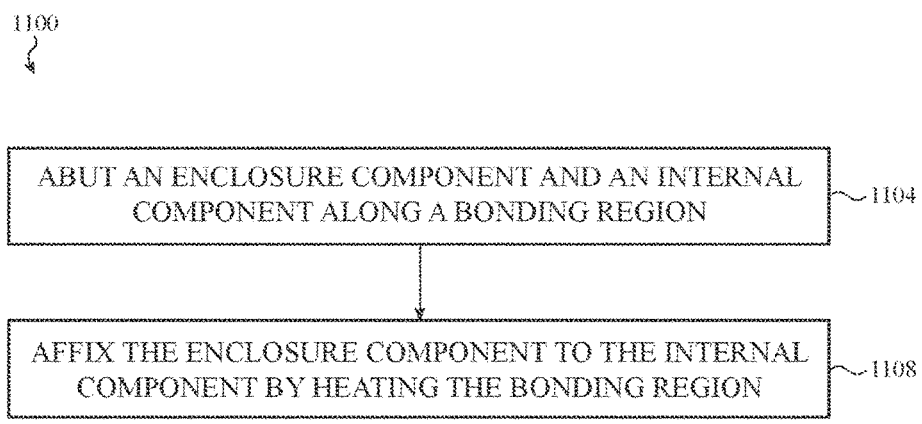
FIG. 11 is a flow diagram of a method for manufacturing a device enclosure.

To facilitate the reader's understanding of the various functionalities of the embodiments discussed herein, reference is now made to the flow diagram in FIG. 11, which illustrates process 1100. While specific steps (and orders of steps) of the methods presented herein have been illustrated and will be discussed, other methods (including more, fewer, or different steps than those illustrated) consistent with the teachings presented herein are also envisioned and encompassed with the present disclosure.

With reference to FIG. 11, process 1100 relates generally to a method of manufacturing a device enclosure having a composite structure, such as the composite structures described herein. The "coupling process" described as forming the various composite structures (e.g., composite structures, 450, 550, 650) may be accomplished using the process 1100.

At operation 1104, an enclosure component may abut an internal component along a bonding region. For example and with reference to FIGS. 4A-4C, the first component 404 may abut the second component 412 at a bonding region substantially defined by the blended melt layer 420. At least the second component 412 may include a interstitial material (e.g., second interstitial material 416). In some cases, the first component 404 may also include a interstitial material (e.g., first interstitial material 408). Accordingly, operation 1104 may cause the second interstitial material 416 to contact the first component 404 or the second component 412.

At operation 1108, the enclosure component may affix to the internal component by heating a bonding region to a temperature that is less than a melting temperature of one of the enclosure component or the internal component. For example and with reference to FIGS. 4A-4C, subsequent to the abutment of the first component 404 and the second component 412, the first component 404, the second component 412, and one, or both, of the first and second interstitial materials 408, 416 (or portions or combination thereof) may be heated to a bonding temperature. This may cause, for example, a portion of the first component 404 and a portion of one or both of the first and second interstitial materials 408, 416 to melt without melting the second component 412.

Operation 1108 may occur subsequent to anodizing at least of the internal component or the enclosure component. For example, the enclosure component may be anodized aluminum structure that is affixed, via process 1100 to a steel internal component. In this regard, according to the embodiments described herein, the steel internal component may be affixed to an anodized enclosure component. This may be due, in part, to the blended melt layer 420 formed as a result of process 1100 that affixes the internal component and the enclosure component to one another.

In some cases, the internal component may be used to affix an electronic component of the electronic device to the enclosure component. For example, with reference to FIG. 8B, the second component 812 may be, or otherwise form, the threaded feature 854. In this regard, the PCB 890 depicted in FIG. 8B may be attached to the first component 404 (that may define the interior surface 850) by advancing a pin through the PCB 890 and into the threaded feature 854.

The melted portion of the first component 404 and the portion of the one, or both, of the first and second interstitial materials 408, 416 may form a blended melt layer positioned between the first component 404 and the second component 412. The blended melt layer may be a heterogeneous layer at which the first component 404 is directly or chemically bonded to one, or both, of the first and second interstitial materials 408, 416. The second component 412 may be affixed to the blended melt layer either directly or via a portion of the second interstitial material 416 that does not melt as a result of the operation 1108.

Various techniques may be implemented to heat the bonding region to the bonding temperature, including techniques to heat a localized region of the bonding region. In some circumstances, the bonding region may be heated by direct heat (e.g., a welding torch or similar implement) and/or an electrical heating element. In other instances, a generalized or localized compression force may be applied to the first component 404 and the second component 412. The compression force may be used to bond the first component 404 and the second component 412 at the blended melt layer 420. Additionally or alternatively, an ultrasonic vibration may be applied to the first component 404 and the second component 412. The ultrasonic vibration may be used to bond the first component 404 and the second component 412 at the blended melt layer 420. In some cases, it may be desirable to actively cool or quench the bonding region, for example, to mitigate material defects at the blended melt layer 420 caused by phase changes within the blended melt layer 420.

In some embodiments, a surface treatment may be performed on a surface of the first component 404, the second component 412, and/or the blended melt layer 420. The surface treatment may include polishing, buffing, sand blasting, or coating (or other appropriate treatments) an outer surface of one or more of the first component 404, the second component 412, and/or the blended melt layer 420. In some cases, the first component 404, the second component 412, and/or the blended melt layer 420 may form an outer surface of an electronic device (e.g., such as the electronic device depicted in FIG. 1). In this regard, the surface treatment may be performed on an outer surface of the electronic device, which may protect and/or aesthetically enhance the outer surface of the electronic device. For example, the outer surface of the electronic device may be coated so that there is no visible seam between the first component 404 and the second component 412.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An enclosure for an electronic device, comprising:
   an enclosure component formed from aluminum and defining:
      an exterior surface of the enclosure;
      an interior surface opposite the exterior surface; and
      a uniform-thickness region having a uniform thickness between the interior surface and the exterior surface;
   a fastener feature formed from steel and affixed to the enclosure component along a bonding region and the uniform-thickness region, the fastener feature affixed to the enclosure component with a blended melt layer comprising:
      an interstitial material having a melting temperature less than a melting temperature of either the aluminum or the steel; and
      a portion of the aluminum from the enclosure component blended with the interstitial material; and
   a rib formed of steel and affixed to the enclosure component within the uniform-thickness region with an additional blended melt layer, the rib defining a passage configured to receive at least a portion of a component of the electronic device.

2. The enclosure of claim 1, wherein the interstitial material comprises at least one of nickel, zinc, or aluminum alloy.

3. The enclosure of claim 1, wherein:
   the enclosure is configured to receive a printed circuit board (PCB); and
   the fastener feature is configured to secure the PCB to the enclosure component.

4. The enclosure of claim 1, further comprising an electrical shield affixed to the enclosure component along the interior surface of the enclosure.

5. The enclosure of claim 1, wherein the rib extends from a first sidewall defined by the enclosure component to a second sidewall defined by the enclosure component.

6. The enclosure of claim 1, wherein the fastener feature is a fastener.

7. A method of manufacturing an enclosure for an electronic device, comprising:
   forming an enclosure component from aluminum, the enclosure component defining:

an exterior surface of the enclosure;
an interior surface opposite the exterior surface; and
a uniform-thickness region having a uniform thickness between the interior surface and the exterior surface;
affixing a fastener feature formed from steel to the enclosure component along a bonding region and the uniform-thickness region, the fastener feature affixed to the enclosure component with a blended melt layer comprising:
an interstitial material having a melting temperature less than a melting temperature of either the aluminum or the steel; and
a portion of the aluminum from the enclosure component blended with the interstitial material; and
affixing a rib formed of steel to the enclosure component within the uniform-thickness region with an additional blended melt layer, the rib defining a passage configured to receive at least a portion of a component of the electronic device.

8. The method of claim 7, wherein the interstitial material comprises at least one of nickel, zinc, or aluminum alloy.

9. The method of claim 7, wherein:
the enclosure is configured to receive a printed circuit board (PCB); and
the fastener feature is configured to secure the PCB to the enclosure component.

10. The method of claim 7, further comprising affixing an electrical shield to the enclosure component along the interior surface of the enclosure.

11. The method of claim 7, wherein the rib extends from a first sidewall defined by the enclosure component to a second sidewall defined by the enclosure component.

12. The method of claim 7, wherein the fastener feature is a fastener.

13. A laptop computer, comprising:
a lid portion comprising a display; and
a base portion comprising a keyboard and pivotally coupled to the lid portion, the base portion comprising:
an enclosure component formed from aluminum and defining:
an exterior surface of the enclosure;
an interior surface opposite the exterior surface; and
a uniform-thickness region having a uniform thickness between the interior surface and the exterior surface;
a fastener feature formed from steel and affixed to the enclosure component along a bonding region and the uniform-thickness region, the fastener feature affixed to the enclosure component with a blended melt layer comprising:
an interstitial material having a melting temperature less than a melting temperature of either the aluminum or the steel; and
a portion of the aluminum from the enclosure component blended with the interstitial material; and
a rib formed of steel and affixed to the enclosure component within the uniform-thickness region with an additional blended melt layer, the rib defining a passage configured to receive at least a portion of a component of the laptop computer.

14. The laptop computer of claim 13, wherein the interstitial material comprises at least one of nickel, zinc, or aluminum alloy.

15. The laptop computer of claim 13, wherein:
the enclosure is configured to receive a printed circuit board (PCB); and
the fastener feature is configured to secure the PCB to the enclosure component.

16. The laptop computer of claim 13, further comprising an electrical shield affixed to the enclosure component along the interior surface of the enclosure.

17. The laptop computer of claim 13, wherein the rib extends from a first sidewall defined by the enclosure component to a second sidewall defined by the enclosure component.

18. The laptop computer of claim 13, wherein the fastener feature is a fastener.

\* \* \* \* \*

UNITED STATES PATENT AND TRADEMARK OFFICE
CERTIFICATE OF CORRECTION

PATENT NO. : 10,447,834 B2  
APPLICATION NO. : 15/606920  
DATED : October 15, 2019  
INVENTOR(S) : Abhijeet Misra et al.

Page 1 of 1

It is certified that error appears in the above-identified patent and that said Letters Patent is hereby corrected as shown below:

In the Claims

Claim 6 should read: The enclosure of claim 1, wherein the fastener feature is a threaded fastener.

Claim 12 should read: The method of claim 7, wherein the fastener feature is a threaded fastener.

Claim 18 should read: The laptop computer of claim 13, wherein the fastener feature is a threaded fastener.

Signed and Sealed this  
Twenty-sixth Day of November, 2019

Andrei Iancu  
*Director of the United States Patent and Trademark Office*